May 9, 1933.  R. G. BOWER  1,907,724
CALCULATING MACHINE
Filed Oct. 2, 1929   12 Sheets-Sheet 1

INVENTOR
Raymond G. Bower
BY
Rector, Hibben, Davis & Macauley
ATTORNEYS

May 9, 1933.  R. G. BOWER  1,907,724
CALCULATING MACHINE
Filed Oct. 2, 1929   12 Sheets-Sheet 4

INVENTOR
Raymond G. Bower
BY
Rector, Hibben, Davis, & Macauley
ATTORNEYS

INVENTOR
Raymond G. Bower
BY
ATTORNEYS

May 9, 1933.　　　　R. G. BOWER　　　　1,907,724
CALCULATING MACHINE
Filed Oct. 2, 1929　　　12 Sheets-Sheet 6

INVENTOR
Raymond G. Bower
BY
Rector, Hibben, Davis, & Macauley
ATTORNEYS

INVENTOR
Raymond G. Bower
BY
ATTORNEYS

May 9, 1933. R. G. BOWER 1,907,724
CALCULATING MACHINE
Filed Oct. 2, 1929 12 Sheets-Sheet 8

INVENTOR
Raymond G. Bower
BY
Rector, Hibben, Davis & Macauley
ATTORNEYS

May 9, 1933.  R. G. BOWER  1,907,724
CALCULATING MACHINE
Filed Oct. 2, 1929   12 Sheets-Sheet 9

INVENTOR
Raymond G. Bower
BY
Rector, Hickey, Davis, & Macauley
ATTORNEYS

May 9, 1933.  R. G. BOWER  1,907,724
CALCULATING MACHINE
Filed Oct. 2, 1929   12 Sheets-Sheet 11
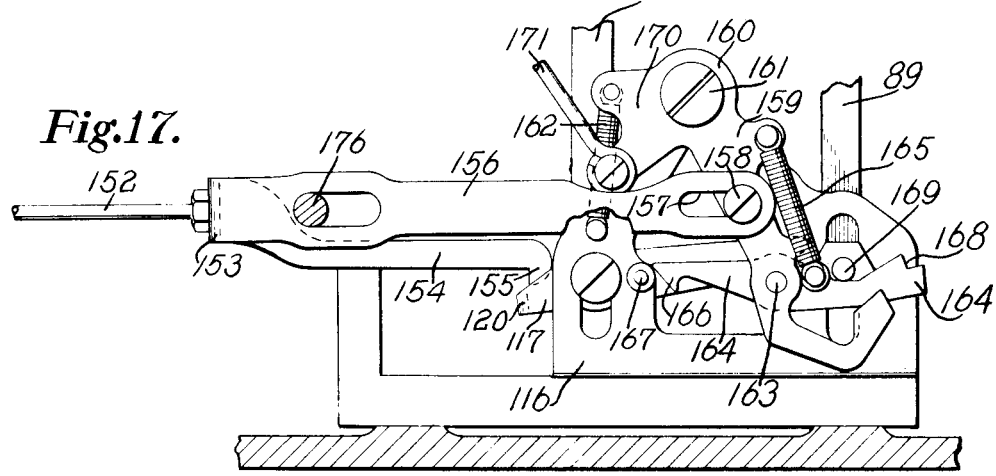
Fig.17.
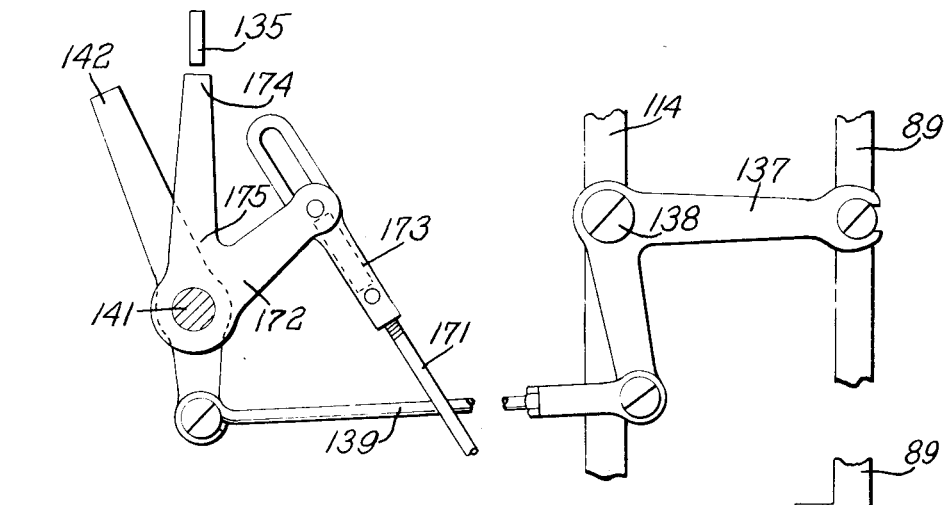
Fig.18.
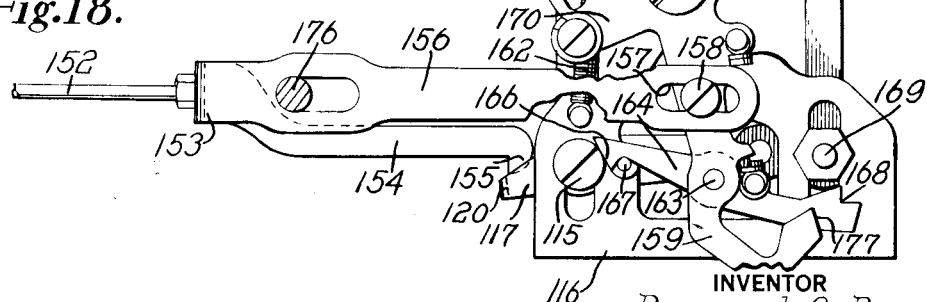
INVENTOR
Raymond G. Bower
BY
ATTORNEYS

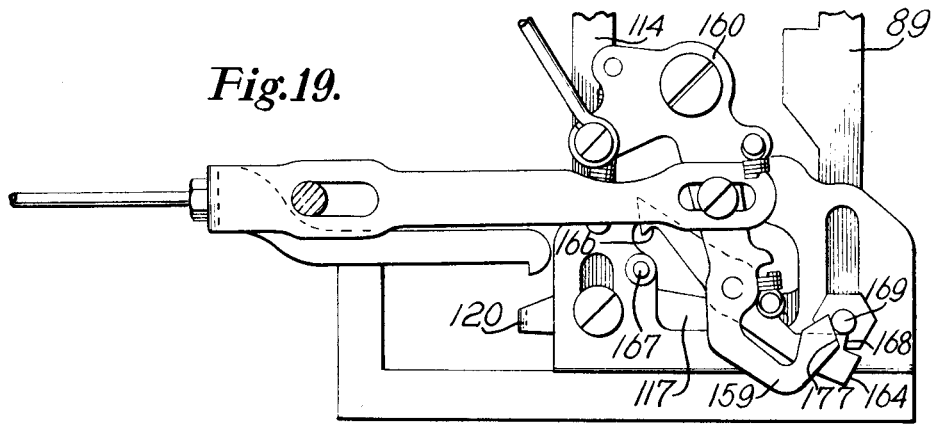
Fig.19.
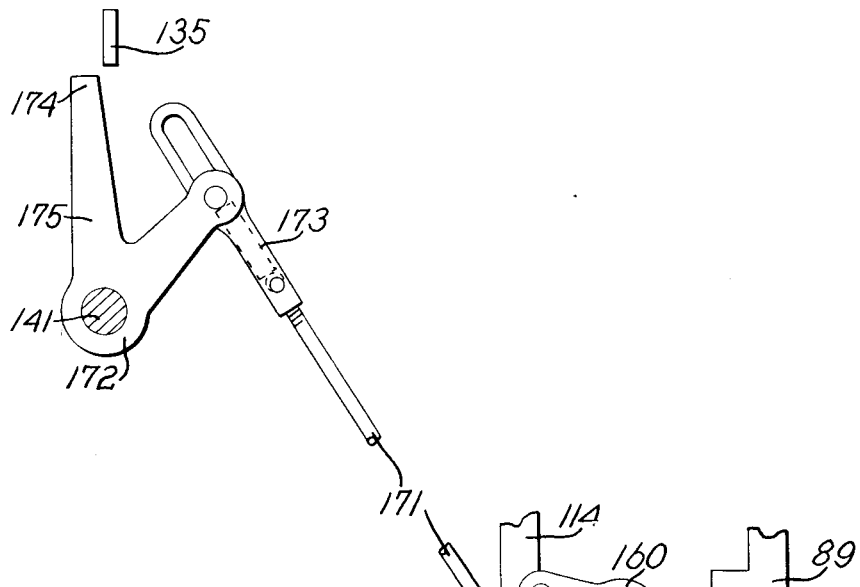
Fig.20.
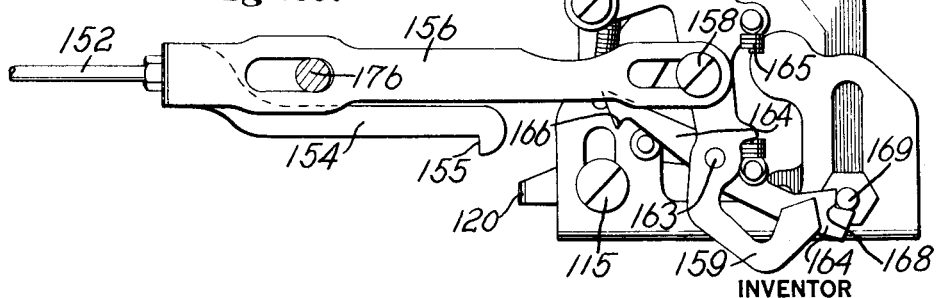

Patented May 9, 1933

1,907,724

UNITED STATES PATENT OFFICE

RAYMOND G. BOWER, OF DETROIT, MICHIGAN, ASSIGNOR TO BURROUGHS ADDING MACHINE COMPANY, OF DETROIT, MICHIGAN, A CORPORATION OF MICHIGAN

CALCULATING MACHINE

Application filed October 2, 1929. Serial No. 396,610.

This invention relates to a calculating machine that will automatically and mechanically prove the accuracy of an operator's work, the invention being particularly applicable to a ten-key type of machine.

Accounting machines are built with precision so that they will operate accurately when properly manipulated but it is always possible for an operator to incorrectly enter items on such a machine, such errors occurring either through misreading the items or through misoperation of the machine. If such an error occurs in a long series of entries discovery of it is laborious and, when discovered, a certain amount or perhaps all of the work must be done over again with consequent trouble and loss of time. In order to avoid such difficulties it is desired to have a check on the accuracy of the operator and the present invention is directed to this end. In order that the invention may be more easily understood a typical series of operations will be described.

In posting a commercial ledger the operator places a ledger sheet in the machine and picks up the customer's old balance which he reads from the last balance on the ledger sheet, the paper carriage being in what is known as the "pick-up" column. The old balance is entered on the amount keys and the machine operated which results in putting the old balance into the register and printing it in the "pick-up" column on the ledger sheet. The paper carriage then automatically tabulates to the transaction columns where "charges" and "credits" are added to or subtracted from the old balance, the various items being printed for each operation. After the charges or credits or both have been posted the paper carriage automatically tabulates to the "balance" column where a new balance is taken from the register which results in printing the new balance in the appropriate column on the ledger sheet. The carriage then automatically tabulates to a "proof" column where the operator is required to enter the old balance a second time by reading it off the ledger sheet, the purpose of this operation being to check the accuracy of the work of the operator in entering the old balance in the "pick-up" column. By requiring the operator to enter the old balance a second time the likelihood of error occurring is greatly reduced as an operator will rarely make the same mistake twice. When the operator enters the old balance the second time it is desirable to not only have him notified if an error has occurred either in the first entry or in the second entry but it is also highly desirable that he be prevented from operating the machine if an error has occurred. In accomplishing these results the present invention not only comprehends making it necessary for the operator to depress, in the second entry of the old balance, exactly the same keys as were depressed in the first entry before he can operate the machine but it also comprehends compelling him to depress the keys in the same sequence as they were depressed in the first entry.

The problem of thus controlling the operation of an accounting machine presents numerous difficulties particularly in the ten key type of machine. In a ten key machine a given key such as the "5" key, for example, may be depressed several times during the entry of an item and these depressions may be successive or they may occur at intervals with depressions of other keys occuring between the intervals. Accordingly, it will be readily appreciated that control of the amount keys in the "proof" column of the machine so as to compel the depression of exactly the same keys as were depressed in the "pick-up" column presents a difficult problem. This problem has, however, been solved by the present invention as will hereinafter appear.

The general object of the invention is to provide an improved mechanism for automatically and mechanically proving the work of an operator of a calculating machine.

A more particular object is to provide an improved proving mechanism in a ten key type of machine.

A further object is to provide a proving mechanism which, when an item has been entered in a given operation of the machine, will subsequently require, in an operation where said item is to be again entered, the depression of the same keys and the depression of said keys in the same succession as they were depressed when the item was first entered.

A further object is to provide an improved proving mechanism that will prevent operation of the machine unless the same keys are depressed and depressed in the same succession as they were depressed when said item was first entered.

Other objects and advantages of the invention will appear from the following specification and drawings.

An embodiment of the invention is shown in the accompanying drawings in which:

Fig. 17 is a partial side elevation of the controlling mechanism for the subtraction key, the parts being illustrated in the position they occupy when the paper carriage is in its "pickup" position and before the subtraction key has been depressed.

Fig. 18 is a view similar to Fig. 17 illustrating the parts in the position they occupy after the subtraction key has been depressed.

Fig. 19 is a view similar to Fig. 17 showing the parts in the position they occupy when the paper carriage of the machine is in its "proof" position but before the subtraction key has been depressed.

Fig. 20 is a view similar to Fig. 19 illustrating the parts in the position they occupy after the subtract key has been depressed.

The invention is illustrated as it is applied to the well known Burroughs-Moon-Hopkins machine. This machine is of the ten key type and while the invention has been shown as applied to it, it is to be understood that the invention may be used with any other suitable type of machine.

General features

In order that the application of the invention may be clearly understood some of the general features of the Burroughs-Moon-Hopkins machine have been illustrated and these will be briefly described, reference being made to Hopkins' Patent No. 1,336,904 for details.

Figure 1:
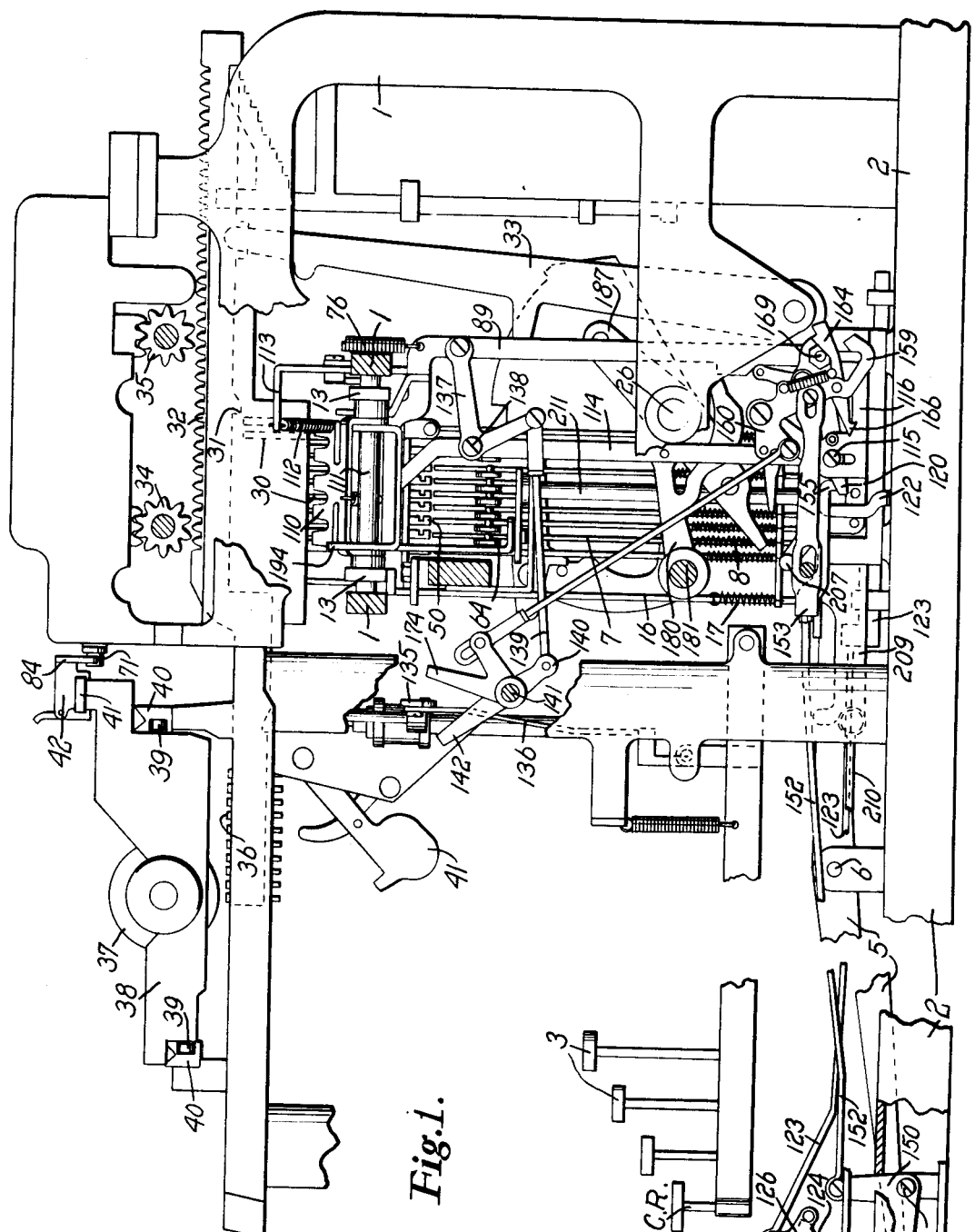
Fig. 1 is a right side elevation of a machine embodying the invention, the casing being removed and certain of the parts being omitted in order that others may be illustrated more clearly, the parts being shown in normal condition.

Referring to Fig. 1 the various parts of machine are carried by a frame 1 supported by a base plate 2. Typewriter keys 3 are provided for enabling an operator to perform ordinary writing operations, the writing mechanism having been omitted from the drawings for the sake of clearness.

Figure 2:
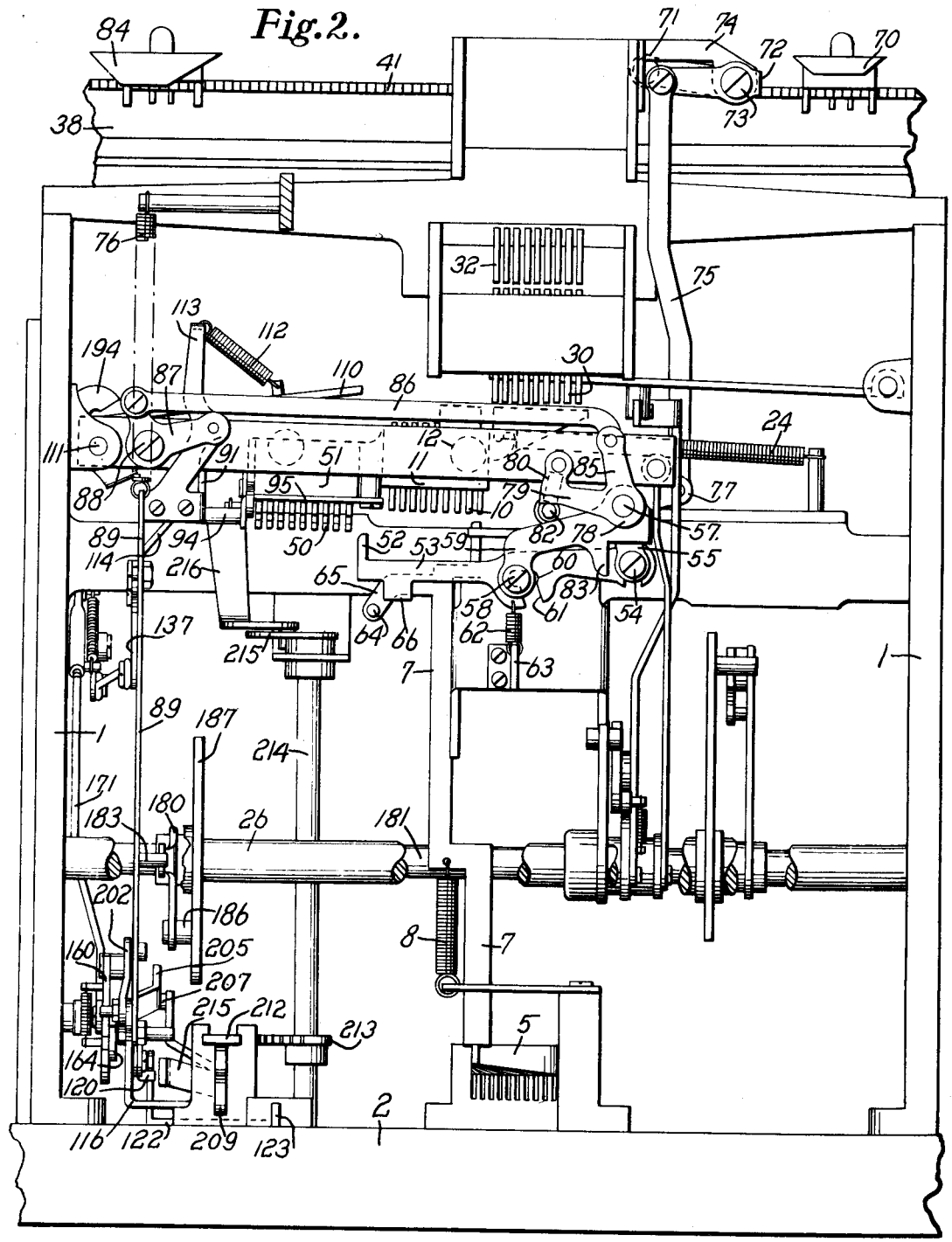
Fig. 2 is a rear elevation of the machine with the casing removed and the parts in normal condition, some of the parts being omitted to show others more clearly.

Calculations are performed by entering items on amount keys 4 of which there are ten numbered from "0" to "9" inclusive. Each amount key is carried on the end of a lever 5 pivoted at 6, the rear ends of the levers being positioned under vertical thrust or indexing bars 7 (Fig. 2), there being an indexing bar 7 for each key lever. Each bar 7 is urged downward by a spring 8, as illustrated in Fig. 2, but whenever one of the keys is depressed the corresponding bar 7 is thrust upward to index one of the pins in a traveling pin carriage.

The traveling pin carriage (Fig. 3) includes a plurality of pins 10 mounted in a carriage 11 that is tabulated across the machine under the control of an escapement mechanism. The carriage has rollers 12 that travel in grooves (Fig. 9) in stationary raceways 13. When one of the amount keys is depressed its indexing bar 7 moves upward and the pin corresponding in value to the value of the depressed amount key is projected upwardly and latched in projected position after which the pin carriage moves over one step so that the next row of pins is moved into line with the indexing bars 7. Depression of another amount key then projects one of the pins in the second row and this continues until pins have been set up in the carriage 11 corresponding to the item entered.

Figure 4:
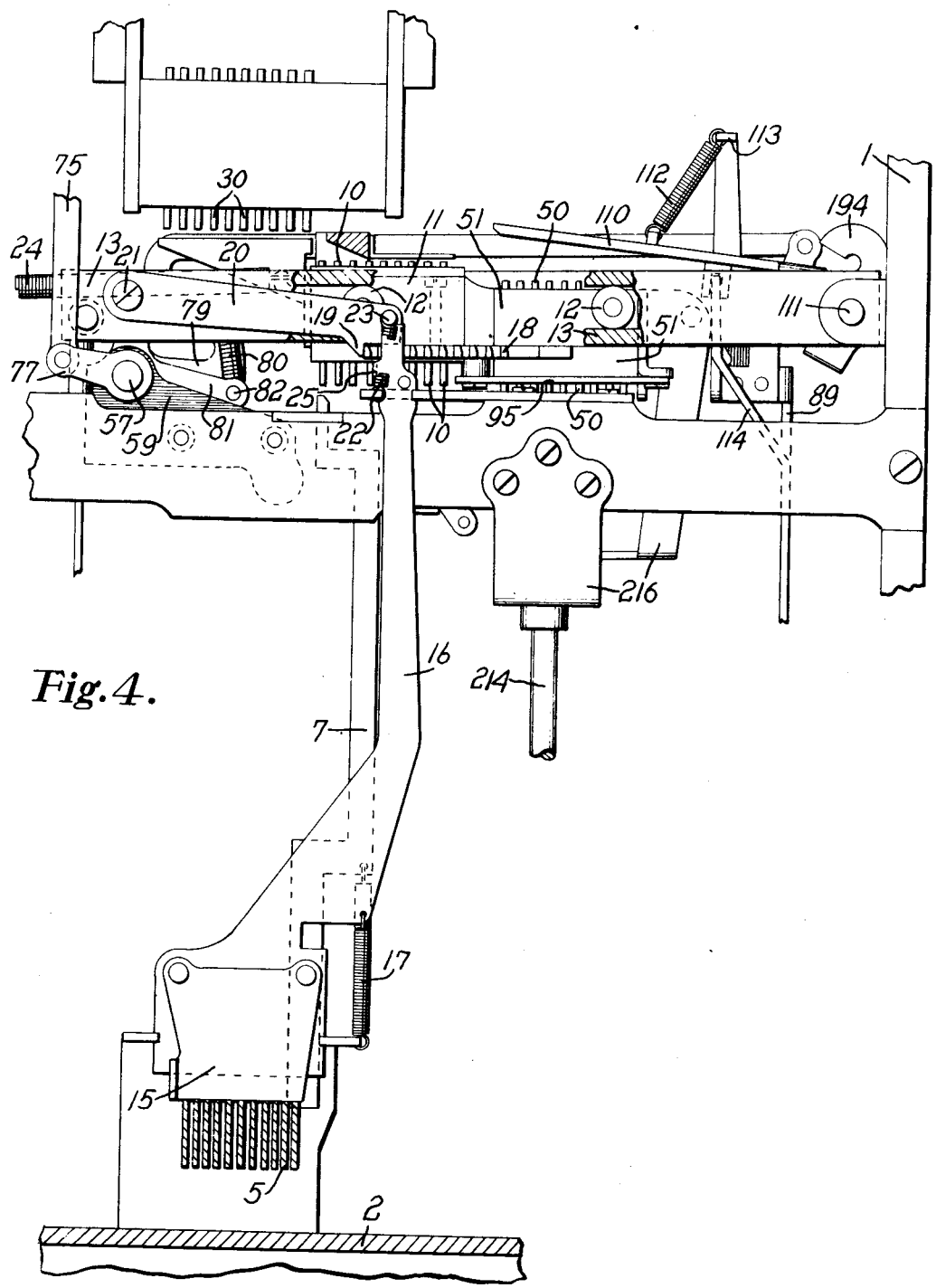
Fig. 4 is a partial front elevation illustrating principally the escapement mechanism for the pin carriage.

The escapement mechanism for the pin carriage is illustrated in Fig. 4 where it will be observed that the rear ends of the amount key bars 5 are positioned under a plate 15 carried by a thrust bar 16 that is urged downward by a spring 17. The pin carriage 11 carries a toothed rack 18 with which cooperates a tooth 19 on an arm 20 pivoted at 21 to one one of the stationary raceways 13 and urged clockwise by a spring 22. The upper end of the thrust bar 16 is positioned under a stud 23 on the arm 20 so that as the bar 16 is moved upward the arm 20 is swung on its pivot to release the rack 18 to permit the pin carriage to move to the left, as viewed in Fig. 4, under the influence of its spring 24. The movement of the carriage is limited by a lateral projection 25 on the thrust bar 16 which moves between the teeth of the rack 18. The initial movement of the rack is just enough to cause one of its teeth to move under the nose 19 of the arm 20 so as to prevent return of the latter. As the thrust bar 16 moves downwardly upon release of the key whose depression raised the bar, the lug 25 releases the rack 18 whereupon the carriage moves to the left until stopped by the tooth 19 on the arm 20 which engages the next tooth on the rack 18. The pin carriage is thus moved to the left step by step under the control of an escapement mechanism which is operated at each depression of one of the amount keys, reference being made to Thieme Patent No. 1,143,240 for further details.

After an item has been entered in the traveling pin carriage 11 the machine is given a stroke of operation by rocking the main drive shaft 26 (Fig. 1) counterclockwise and returning it clockwise by hand or by means of a motor. During operation of the machine the pin carriage 11 is raised bodily to cause its projected pins to engage corresponding pins in a stationary field of stop pins 30 (Fig. 2), with the result that pins are projected in the stationary field of stops which correspond in digital value in each order with the pins projected in the traveling pin carriage.

The pins in the stationary field of stops are projected in the paths of shoulders 31 on actuator racks 32 (Fig. 1) which, during operation of the machine, are moved to the left as viewed in Fig. 1 under the influence of spring urged arms 33. One or more registers 34 and 35 are engaged and disengaged with the actuator racks in the necessary order to perform various calculating operations such as addition, subtraction, multiplication, division, taking totals and subtotals. The actuator racks carry type 36 which are positioned relative to a platen 37 at the time the actuator racks are positioned.

The machine has a laterally moving paper carriage 38 which supports the platen 37, the carriage being moved step by step across the machine on rollers 39 traveling in raceways 40 under the control of an escapement mechanism (not shown). The paper carriage supports a toothed bar 41 on which may be adjustably positioned a number of controlling stops 42 used to control various functions of the machine including some of the functions hereinafter described.

The machine is capable of multiplication and division as well as addition and subtraction, such operations being accomplished in a manner described in detail in the Hopkins' patent referred to.

A subtract key S is provided which controls suitable mechanism for conditioning the machine to perform subtraction.

An error key E may be pressed inwardly to restore depressed keys to normal and to return the traveling pin carriage 11 to normal when an error has occurred, the pins being restored automatically at the same time.

The machine is preferably driven by an electric motor (not shown) and the motor is caused to give the machine a stroke of operation by the depression of a motor bar M which controls suitable well known devices that have not been illustrated as they are not necessary for an understanding of the present invention, reference being made to said Hopkins' patent.

*Proving mechanism*

It is obvious that, in the case of a ten key machine, the same key may be depressed more than once in the entry of a single item in the machine. This key may be depressed successively a number of times or it may be depressed a second time after a number of other keys have been depressed. When it comes to the control of the amount keys in the "proof" column it is necessary to control them in such a manner as to insure that the same keys will be depressed in the same order as they were depressed in the "pickup" column and such action must take place regardless of whether a given key has been depressed once or a number of times. The present invention comprehends a construction which compels the operator, when the machine is in the "proof" column, to depress the same amount keys in the same order as they were depressed in the "pickup" column in order to start the machine. In other words the machine can be operated in the "proof" column only in exactly the same manner as it was operated in the "pickup" column. It is to be understood that, when the machine is operated in the "proof" column, the operator reads the figures of the old balance from a ledger sheet and attempts to operate the keys correctly. If he attempts to depress the wrong key he finds it locked against depression which immediately notifies him that a mistake has been made and causes him to try to make the entry again. If the keys he attempts to depress are the correct keys for the old balance and if he is still unable to depress one of them that should be depressed, he is notified that a mistake has been made in the "pickup" column. This notification has taken place before the item is entered in the "proof" column.

Figure 9:
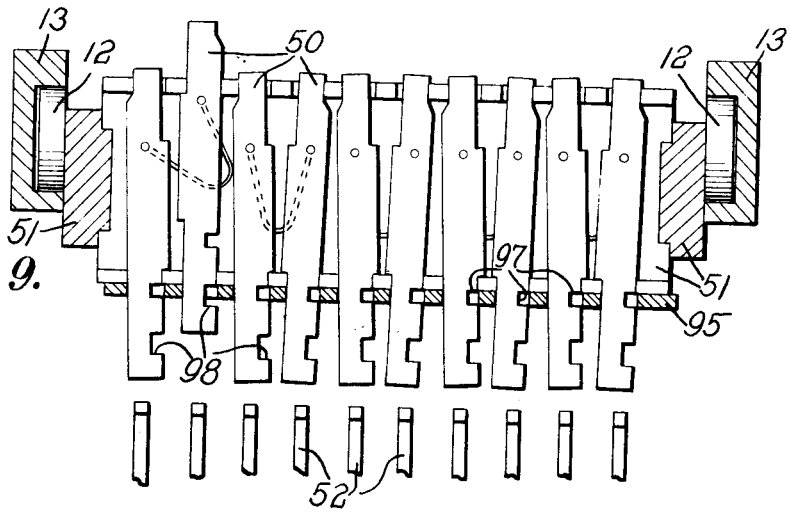
Fig. 9 is a partial section showing the construction of the pin carriage of the proving mechanism.

The proof mechanism includes a second set of pins 50 (Fig. 2) which, for purposes of convenience, will be called the proof pins. This group of pins is carried by an extension 51 (Fig. 2) of the traveling pin carriage 11 which extension forms, in effect, another carriage that, for convenience, will be called the proof carriage. The number of rows of proof pins and the number of pins in each row are the same as in the traveling pin carriage 11 and the pins are constructed to be projected upward in the same manner as the pins 10, as illustrated in Fig. 9.

The pins 50 are projected upwardly by extensions 52 on thrust arms 53 pivoted on a shaft 54 carried by the arms 55 (Fig. 3) of a yoke 56 that is loosely journaled on a shaft 57 which, in turn, is journaled in a stationary portion of the frame of the machine. The thrust arms 53 are supported for endwise sliding movement by a shaft 58 carried by stationary arms 59. Each thrust arm 53 has an elongated slot 60 (Fig. 2) in which the shaft 58 is positioned. These elongated slots open on their lower sides into inclined slots 61 which, when the arms 53 are slid to the left from their Fig. 2 position, permit the arms to be rocked upward on their pivots. The shaft 58 acts as a support and also as a lock to prevent pivotal movement of the arms 53 when they are in their Fig. 2 position. Each arm 53 is urged counter clockwise by a spring 62, the springs being connected to their respective arms and to a stationary bar 63 (Fig. 3).

The thrust arms 53 are moved upward by means of studs 64 (Fig. 2) carried on extensions 65 of the thrust bars 7 that are moved upward by depression of the amount keys. The studs 64 are adapted to engage projections 66 on the lower ends of arms 53 when the projections are positioned in the paths of said studs. This does not occur except under certain conditions, which will presently be described.

When the paper carriage is in its "pickup" position, it is in the position where the item that is entered is the item that it is desired to prove at a later time when the carriage is in its "proof" column. Accordingly, when the carriage is in the "pickup" position the proving mechanism should be in condition to be set by the entry of an item. This condition is brought about by means of a small cam shaped member 70 (Fig. 2) adjustably mounted on the rack 41 of the paper carriage. As the paper carriage moves to the "pickup" column this cam engages a roller 71 carried by one arm of a yoke 72 pivoted at 73 on a frame member 74, the other arm of the yoke being connected to a link 75 urged upward by a spring 76. The link 75 is connected at its lower end to an arm 77 fixed to the shaft 57 (Fig. 3). Also fixed to the shaft 57 is a bell crank 78 one arm 79 of which is connected by a spring 80 to an arm 81 of the yoke 56 that is loosely journaled on the shaft 57. The arm 81 carries a stud 82 positioned under the edge of the arm 79 of the bell crank lever 78.

Figure 3:
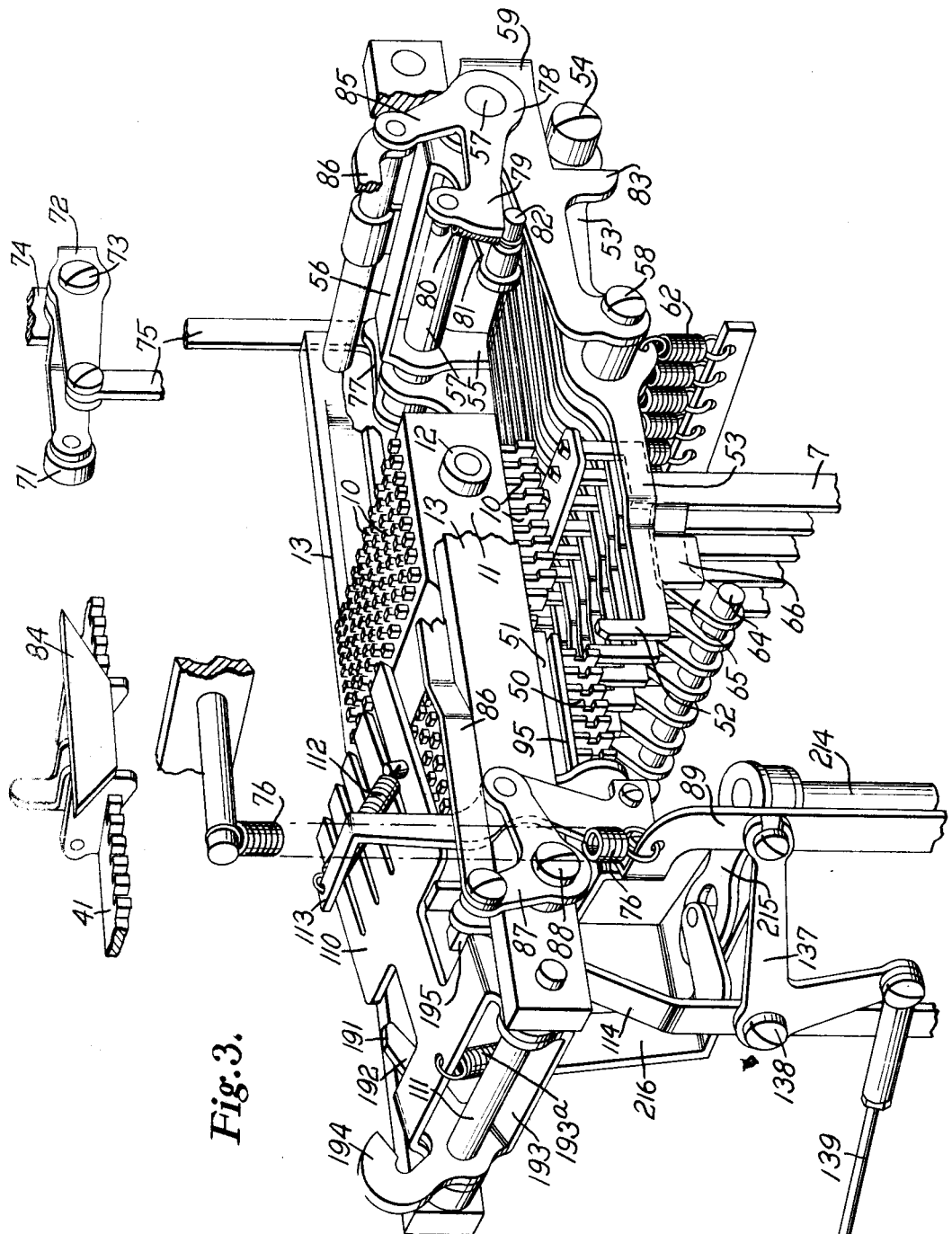
Fig. 3 is a perspective view illustrating the pin carriages and some of the parts associated therewith, the parts being in normal condition.
Figure 5:
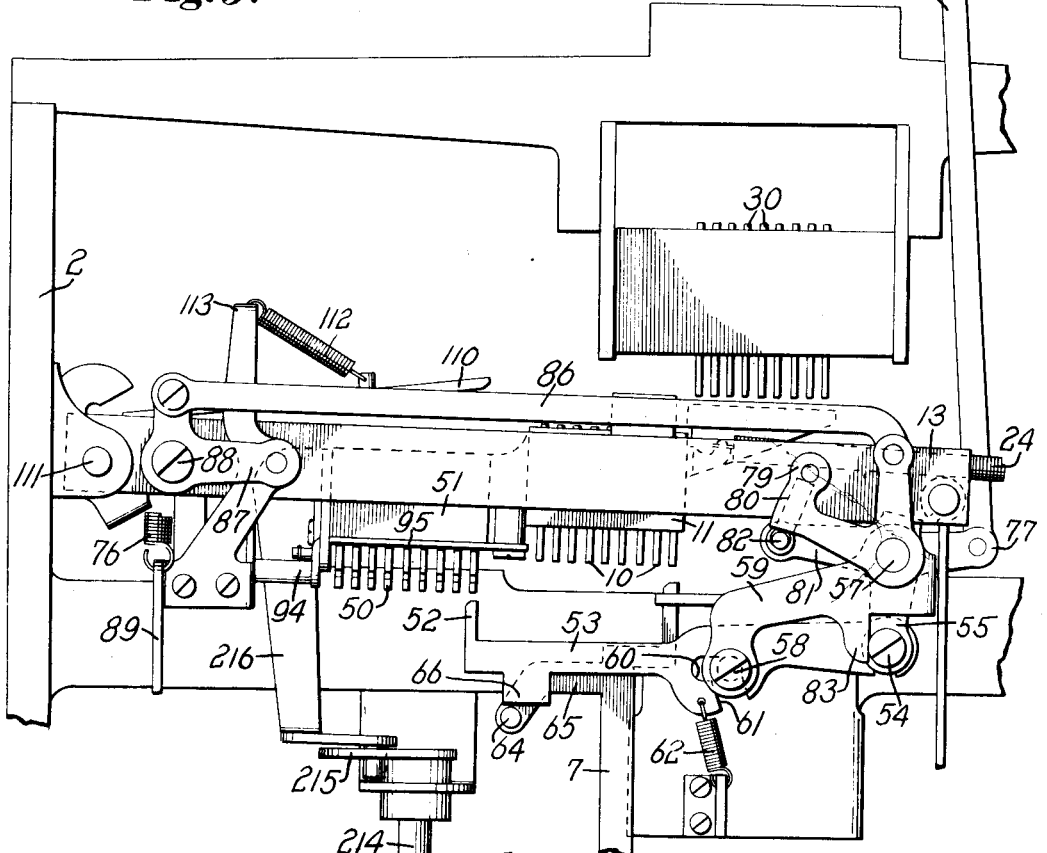
Fig. 5 is a partial rear elevation showing the pin carriages and some of the controls therefor, the parts being shown in the position they occupy when the paper carriage is in its "pickup" position and before an item has been entered.

When the cam 70 on the carriage strikes the roller 71 the link 75 is thrust downward which rocks the shaft 57 clockwise as viewed in Figs. 2 and 3. This rocks the bell crank 78 clockwise and the latter, through the spring 80, rocks the yoke 56 clockwise thereby moving the arms 53 to the left from their Fig. 2 to their Fig. 5 position. It will be noted that, in the latter position, the projections 66 on the arms 53 are above the studs 64 on the extensions 65 of the thrust bars 7. The movement of the shaft 54 to the left is limited by a projection 83 on the stationary member 59 which is engaged by the end of the shaft as shown in Fig. 5.

Figure 6:
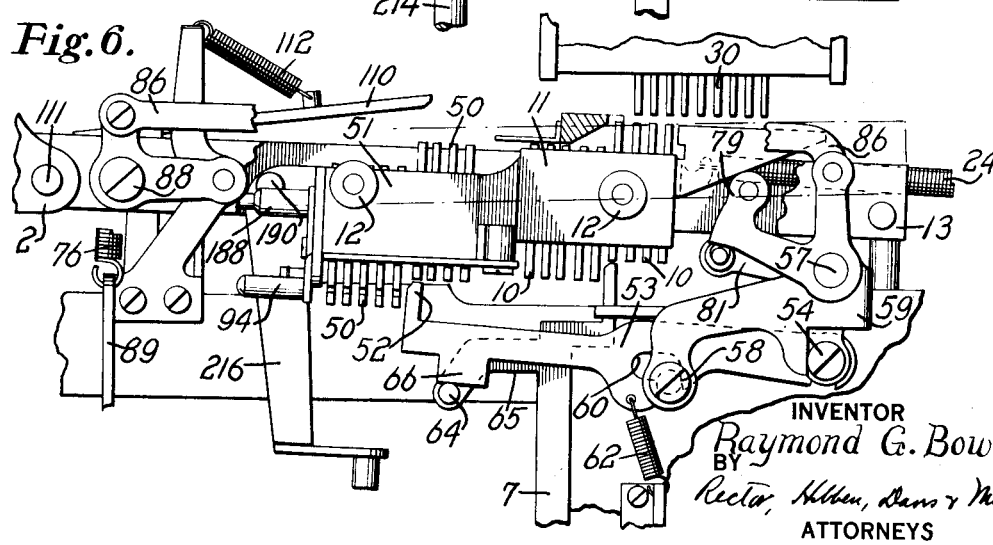
Fig. 6 is a view similar to Fig. 5 showing the parts in the position they occupy after several of the amount keys have been depressed, the operating mechanism for the carriage pins being illustrated in the position it occupies as the pins are being operated.

Accordingly, when the paper carriage is in its "pickup" position the thrust arms 53 are positioned so that as the thrust bars 7 are raised by depression of the amount keys, the thrust arms 53 are swung upward on their pivots as shown in Fig. 6. The result is that, when an amount key is depressed, a proof pin 50 corresponding in value to the key depressed is projected upwardly and set at the same time that a pin 10 of the traveling pin carriage is projected and set. Inasmuch as the proof carriage steps across the machine with the traveling pin carriage, and since the pins 50 are of the same number and arranged in the same way as the pins 10, the item that is entered in the machine in the "pickup" position of the carriage is entered on the pins 50 in exactly the same manner as it is on the pins 10.

After the proof mechanism has been set it is desirable to have the machine left free to perform other operations, the proof mechanism not being needed until the "proof" column is reached. Accordingly, the proof mechanism is temporarily rendered inactive so as not to interfere with the operation of the machine. As soon as the paper carriage leaves its "pick-up" column the cam 70 moves away from the roller 71 whereupon the parts are returned to normal under the influence of spring 76. This spring acting through connections hereinafter described, rocks the shaft 57 counterclockwise which moves the shaft 54 and thrusts the arms 53 to the right from the position of Fig. 5 to that of Fig. 2 so that the projections 66 are out of the paths of the studs 64. Depression of the amount keys will not affect the proving mechanism when the parts are in this position. In other words, the proving mechanism has been rendered inactive and it does not interfere with other operations of the machine until such time as it is desired to prove the entry that was made in the "pick-up" column.

When the paper carriage reaches its "proof" column where it is desired to again enter the old balance that was entered in the "pickup" column, it is necessary to render the proving mechanism active and this is accomplished by means of a cam 84 (Fig. 2) adjustably mounted on the bar 41 on the paper carriage. This cam is slightly larger than the cam 70 so that when it engages the roller 71 it thrusts the link 75 down further than when the roller was engaged by the cam 70. The downward thrust of the link 75 moves the thrust arms 53 into the position of Fig. 5 the same as when the link was moved down by the cam 70. The increased movement of the link 75 does not move the thrust arms 53 any further to the left owing to the fact that the shaft 54 is limited by engagement with the stop 83 but further rocking of the shaft 57 may take place owing to the fact that the spring 80 connecting the bell crank arm 79 and the arm 81 of the yoke 56 permits movement of shaft 57 relative to yoke 56.

The bell crank 78 has another arm 85 connected to one end of a horizontal link 86 whose other end is connected to a second bell crank lever 87 pivoted at 88 to one of the raceway frames 13 and connected, in turn, to an irregular shaped member 89 urged upward by the spring 76. The member 89 has an extension 91, best illustrated in Figs. 10 and 11, the extension being provided with an upper cam nose 92 and a lower cam nose 93. The lower cam nose 93 is adapted to engage a stud 94 on a locking plate 95 that is urged to the right, as viewed in Fig. 10, by a spring 96. The plate 95 is adapted to engage notches in the proof pins 50, there being two notches in each pin, an upper notch 97 and a lower notch 98.

Figure 10:
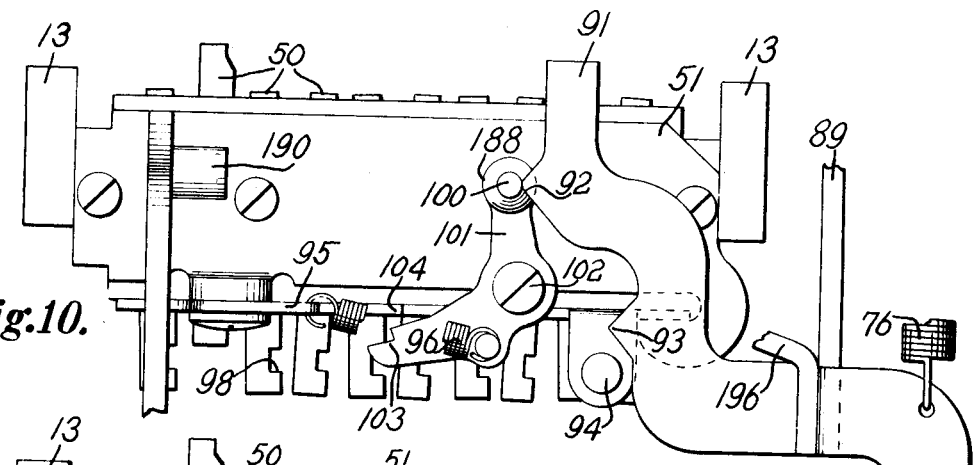
Fig. 10 is a partial right side elevation showing the pin carriage of the proving mechanism with the controls in the position they occupy when the paper carriage of the machine is in "pickup" position.

When the paper carriage moves to its "proof" column and the link 75 is moved down, the link 86 is moved to the right, as viewed in Fig. 2, through the connections heretofore explained, which thrusts the member 89 downward. The downward movement of member 89 causes the cam nose 93 to engage the stud 94 to move the locking plate 95 to the left as viewed in Fig. 10, the plate moving into the notches of all of the pins 50. In the case of pins which are raised, the plate moves into the lower notches 98 and, in the case of pins which are not raised, the plate moves into the upper notches 97, all the pins 50 being locked in position when the plate is moved from the position of Fig. 10 to the locking position of Fig. 11. The upper cam nose 92 of the extension 91 of the member 89 is adapted to engage a stud 100 carried by a latch 101 pivoted at 102 to the pin carriage frame and urged clockwise by the same spring 96 that urges the plate 95 to the right. This latch 101 is held in disabled condition when the carriage is in its "pickup" position, as illustrated in Fig. 10, by the nose 92, but, when the member 89 is moved downward in the "proof" column of the paper carriage, the latch is released and when the locking plate 95 is moved to the left to its Fig. 11 position, the latch snaps into its Fig. 11 position where its shoulder 103 engages behind a locking edge 104 on the plate. The locking plate is thus latched to its locking position in the "proof" column so as to hold all of the proof pins 50 in the positions in which they were set by the entry of the item when the paper carriage was in its "pickup" position.

It will thus be clear that, when the paper carriage moves to its "proof" position the large cam 84 causes the thrust arms 53 to be moved to their active position where they are ready to be moved by the amount keys as the latter are depressed. Also the cam 84 causes the proof pins 50 to be locked in the position in which they were set by the entry of the old balance when the carriage was in its "pickup" column.

Figure 7:
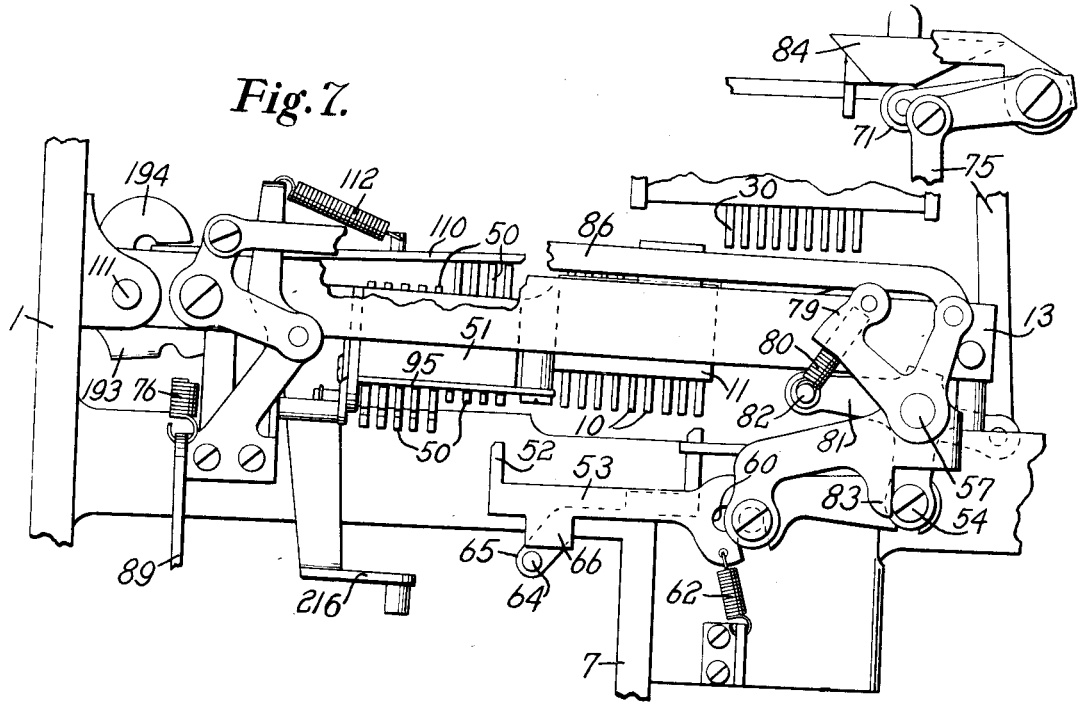
Fig. 7 is a partial rear elevation similar to Fig. 5 showing the parts in the position they occupy when the paper carriage is in its "proof" position and before an item has been entered.

When the parts are in this condition the thrust arms 53 are in position to be moved with the thrust bars 7 and hence, when any one of the amount keys is depressed, its corresponding thrust arm 53 must move with it. However, since the proof pins 50 are locked, none of the thrust arms 53 can move upward except those that were moved upward when the paper carriage was in its "pickup" position because the only pins 50 that are in their upper positions are those that were thrust upward in the "pickup" position of the paper carriage. In Fig. 7 four of the pins 50 have been illustrated in their upper positions, these four pins being in the first order which would be the "0" order. These particular pins have been illustrated in the drawings for convenience, it being understood that, normally, pins in various orders would be thrust upward and, ordinarily, four pins in the zero order would not be used but, since the operation is the same, the four "0" pins have been illustrated to simplify the drawings. In this example, it will be clear, that in the thousands order, the only arm 53 that can be moved upward is the arm controlled by the "0" key because all the other pins 50 in the thousands order are locked in their downward positions. Should the operator attempt to depress any other of the ten keys he will find them locked, but the "0" key will be free and when it is depressed, the traveling pin carriage will move to the right one step thereby placing the hundreds order of pins in line with the thrust bar 7 and the thrust arms 53. Again it will be impossible to depress any of the keys except a "0" key in the hundreds order. The same is true for the tens and units orders in the example illustrated. The operator is thus prevented from depressing any keys except those that were depressed when the paper carriage was in the "pickup" column and the keys that are depressed must be depressed in the same sequence as in the "pickup" column. For example, if the keys depressed in the "pickup" column were the 4, 3, 7 and 8 keys, then, as each of the thousands, hundreds, tens, and units orders of pins came into position under the ends of the thrust arms 53, only the 4, 3, 7 and 8 keys in the respective orders can be depressed because all of the other pins in these orders will be locked in their lower positions. The operator cannot depress any more keys than were depressed in the "pickup" position of the carriage because as soon as the proof carriage is stepped over so that the ends of the thrust arms 53 are under a row of pins in an order in which no pins were moved in the "pickup" position all of the keys will be locked against depression.

*Insuring that all of the keys will be depressed*

As heretofore explained, when the carriage is in its "proof" column, only the keys can be depressed that were depressed in the "pickup" position of the carriage and no additional keys can be depressed, but it is possible that the operator would not depress all of the keys. He might depress the right keys as far as he went but might not complete the operation. This would result in an error as disastrous as if the wrong key were depressed. Provision is accordingly made to prevent operation of the machine unless all keys are depressed in the "proof" column that were depressed in the "pickup" column of the carriage.

Referring to Fig. 3, a comb plate 110 is positioned above the field of proof pins 50, the comb plate being pivoted on a shaft 111 and being normally held upward by a spring 112 connected at one end to a stud on the comb plate and at the other end to an extension 113 of the member 89. Attached to the comb plate 110 is a downwardly extending link 114 (Fig. 12) the lower end of which carries a stud 115 slidably mounted in a stationary plate 116. Pivoted on the stud 115 is an arm 117 whose right hand end is bifurcated to straddle a stud 118 on a lateral extension 119 on the lower end of the member 89. The left hand end of the arm 117, as viewed in Figs. 12 and 13, has a lateral lug 120 adapted to engage behind a hook 121 on an extension 122 of a sliding rod 123 (Fig. 13). The sliding rod 123 is connected to an arm 124 pivoted at 125 at the front of the machine (Fig. 1) which is connected through a spring 126 to one arm of a bell crank 127 pivoted at 125, the other arm of the bell crank lever being connected to the motor bar M. Normally the machine is caused to be given a stroke of operation by depression of the motor bar which rocks the bell crank 126 counter clockwise and pulls the rod 123 forward to operate mechanism (not shown) to connect the motor to the machine for a stroke of operation.

Figure 12:
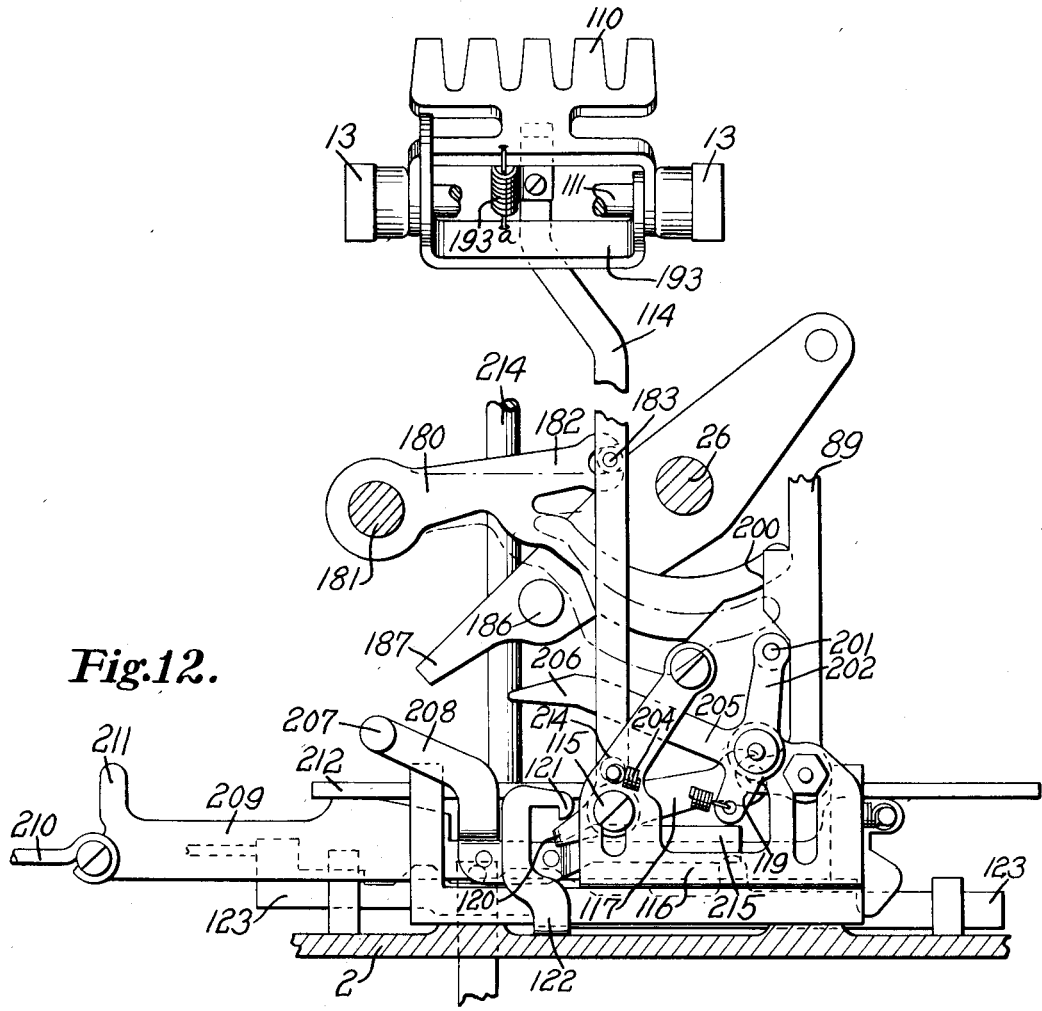
Fig. 12 is a partial right side elevation illustrating particularly the locking mechanism for the error key and the motor bar, the parts being shown in normal position.
Figure 13:
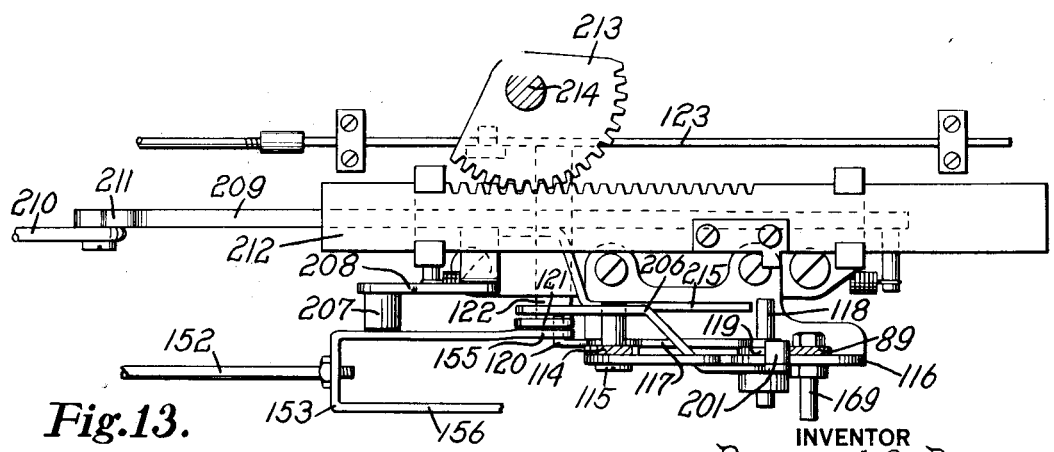
Fig. 13 is a partial sectional plan view of the mechanism illustrated in Fig. 12.
Figure 15:
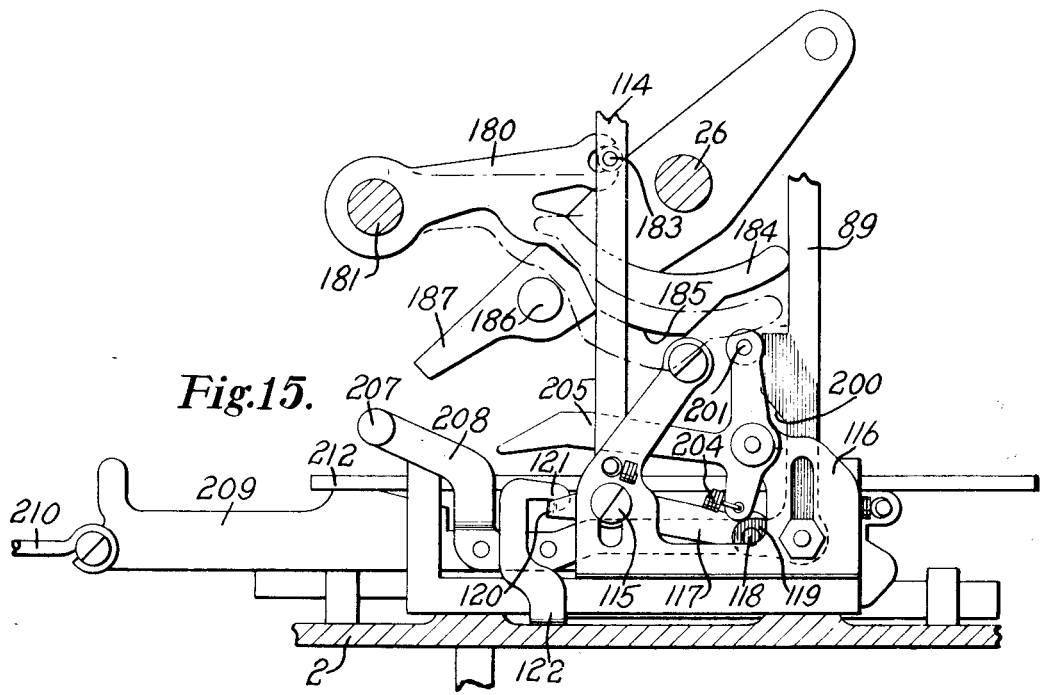
Fig. 15 is a view similar to Fig. 14 illustrating the parts in the position they occupy when the paper carriage is in its "proof" position.

When the member 89 is moved downward under the control of the cam 84 as the paper carriage moves to its "proof" position the arm 117 is swung from the position of Fig. 12 to that of Fig. 15 which moves the lateral lug 120 behind the hook 121 thereby blocking forward movement of rod 123 and locking the motor bar against depression.

The downward movement of the member 89 also moves downwardly the extension 113 to which the spring 112 is connected, the spring being moved more nearly to a horizontal position and to such a position that it allows the comb plate 110 to drop on top of the pins 50, these pins being locked in position at the time. The comb plate cannot move down very far owing to the fact that it strikes the tops of the raised pins as illustrated in Fig. 7. As the proof carriage is stepped to the right from its Fig. 7 position, the raised pins 50 move from under the comb plate 110 and when the last raised pin is moved from under the plate the plate drops down to the position of Fig. 8 which moves the link 114 downward. This moves the stud 115 downward and results in moving the arm 117 down far enough to move the lateral lug 120 below the hooked end 121 of the extension 122. This frees the motor bar but it will be evident that if the operator should attempt to depress the motor bar before he has depressed all of the keys in the "proof" column that were depressed in the "pickup" column of the carriage he will find the motor bar locked and operation of the machine cannot be obtained. This insures that the operator will not stop short of entering the complete item in the "proof" column. If he does stop short he cannot set the machine into operation which notifies him of his error. As soon as he depresses the additional key the motor bar is released and operations can be continued.

Carriage lock

When the paper carriage is in its "proof" position it is, of course, desirable to insure that the operator will not move the carriage out of its "proof" position until after all of the keys have been depressed. Accordingly, a lock is provided that prevents the operator from setting into operation the carriage return mechanism until after all of the proper keys have been depressed in the "proof" position of the carriage.

Figure 16:
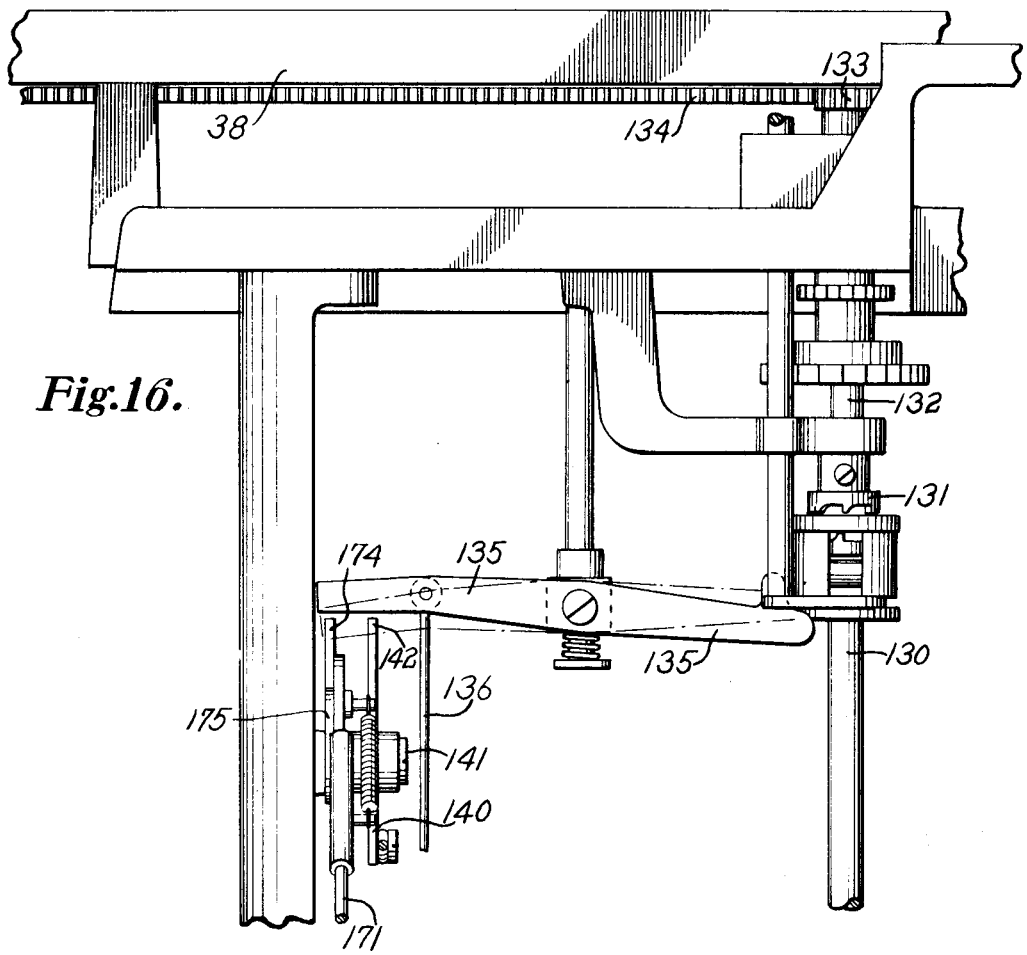
Fig. 16 is a partial rear elevation of the automatic return mechanism for the paper carriage illustrating how this mechanism may be locked under certain conditions.

The carriage return mechanism is well known and need not be described in detail, but portions of it have been illustrated in Fig. 16. The mechanism is operated by a power shaft 130 that operates through a clutch 131 on a pinion shaft 132 carrying a pinion 133 meshing with a rack 134 on the paper carriage. The clutch is normally disengaged but it may be moved into engaged position to cause the carriage to be returned across the machine by means of a pivoted lever 135 that may be rocked counterclockwise, as viewed in Fig. 16, by means of a rod 136 which is drawn downwardly by depression of a carriage return key C R, the connections between the key and the rod 136 being shown in Fig. 1.

Referring to Fig. 1 it will be noted that the member 89 that is thrust downwardly by the paper carriage when the latter reaches its "proof" position is connected to one arm of a bell crank lever 137 pivoted at 138 to the link 114. The other arm of this bell crank lever is connected to a link 139 which, in turn, is connected to one end of an arm 140 pivoted on a stud shaft 141. The upper end 142 of the arm 140 is adapted to be positioned under the lever 135 that must be rocked to move the carriage return clutch to operating position. It will be clear that, if the end 142 of the lever 140 is under the edge of lever 135, as it will be when the carriage enters the "proof" column, the lever 135 cannot be rocked to its dot and dash position of Fig. 16 and hence the carriage return mechanism cannot be operated.

It will be recalled that the link 114 to which the bell crank lever 137 is pivoted is movable up and down, the link being connected to the comb plate 110 that contacts the tops of the pins 50 of the proof carriage. Up and down movement of the link 114 changes the pivot point 138 of the bell crank 137 relative to the member 89 and hence changes the position of the bell crank. The parts are proportioned so that when the link 114 is in its upper position and the member 89 is in its lower position, as is true when the carriage is in its "proof" position with some of the pins 50 raised, the end 142 of the arm 140 is under the edge of the lever 135. This condition obtains in the "proof" position of the paper carriage until all the proper amount keys have been depressed. As previously explained, the comb plate 110 to which the link 114 is connected cannot move downward until after all the proper keys have been depressed in the "proof" position of the carriage. Consequently, the carriage return mechanism will remain locked until all the proper keys have been depressed but when all of these keys have been depressed the comb plate 110 moves downward which causes the link 114 to move down thereby swinging the bell crank lever 137 counter clockwise sufficiently to move the end 142 of arm 140 out from under the edge of lever 135, thus unlocking the carriage return mechanism.

In this manner the operator is prevented from returning the carriage when the latter is in "proof" position until after all of the proper amount keys have been depressed.

Subtract key control

The fact that the machine is provided with a subtract key to enable negative amounts to be entered introduces additional factors in connection with the proving operations.

For example, if the subtract key is not depressed when the paper carriage is in its "pickup" position it must not be possible for the operator to depress the subtract key when the paper carriage is in its "proof" position, but at the same time the subtract key must be free for operation during all intermediate machine operations.

Again, if the subtract key is depressed while the carriage is in its "pickup" position, as would occur if the old balance to be entered were a credit balance, provision must be made for insuring that the operator will enter the balance as a negative or credit balance when the paper carriage is in its "proof" position.

Provision is also made for preventing depression of the subtract key when the paper carriage is in its "proof" position until after all of the proper amount keys have been depressed since the motor usually automatically operates the machine upon depression of the subtract key.

The subtract key S (Fig. 1) is connected to a bell crank lever 150 pivoted at 151 and connected to a rod 152 that is pulled forward when the subtract key is depressed.

Referring to Fig. 17, the rod 152 that is pulled forward by depression of the subtract key S is connected to a U-shaped member 153, one arm 154 of which has a hooked end 155 positioned adjacent the lateral lug 120 on the pivoted lever 117.

Assume first an operation in which the subtract key is not depressed in the "pickup" position of the carriage. The subtract key is free for depression and it remains so during intermediate operations preceding the "proof" column because, as will be recalled, the lever 117 normally occupies the position illustrated in Fig. 12, where it is below the hooked end 155 of arm 154. When the paper carriage reaches its "proof" position, member 117 moves clockwise to the position of Fig. 15. In this position the lateral lug 120 is in front of the hooked end 155 of the member 153–154 thereby preventing forward movement of the latter which prevents depression of the subtract key S. Accordingly, if the subtract key was not depressed when the paper carriage was in its "pickup" position, it cannot be depressed when the paper carriage reaches its "proof" position. Even though the proper amount keys are depressed in the "proof" column and the lever 117 released from locking engagement with hook 155, a stud 169 on link 89 moves inside of the hooked end of an arm 159 to prevent depression of the subtract key, the parts 159 and 169 being described in more detail later.

The other arm 156 of the U-shaped member 153 is provided with a slot 157 in which is positioned a stud 158 mounted on one arm 159 of a bell crank lever 160 pivoted at 161 and urged counter clockwise by a spring 162. Pivoted on the arm 159 of the bell crank lever at 163 is a latch 164 urged counter clockwise by a spring 165 and provided with a hooked end 166 adapted to engage over a stud 167 on the stationary plate 116. This latch also has a shoulder 168 adapted to engage behind a stud 169 carried by the member 89. The other arm 170 of the bell crank lever 160 is connected by a link 171 to another bell crank lever 172 (Fig. 18) the connection being a yielding one through the spring 173. The bell crank 172 is pivoted on the stud shaft 141 and the end of 174 of one of its arms 175 is adapted to be positioned under the lever 135 that controls the carriage return clutch heretofore explained.

If the subtract key is depressed when the carriage is in its "pickup" position the parts are moved from the normal position of Fig. 17 to the position of Fig. 18. Depression of the subtract key pulls the member 156 forward which rocks the bell crank 160 clockwise. This causes the hooked nose 166 of the latch 164 to pass over the stud 167. When pressure on the subtract key is removed and as the subtract key slide moves back to normal under the influence of the usual spring (not shown), this latch catches on the stud 167 and holds the parts in the position of Fig. 18 with the end 174 of the bell crank arm 175 under the lever 135.

With the parts latched in this position of Fig. 18 the subtract key is free for depression while the carriage is in its various "transaction" positions but when the carriage reaches its "proof" position the parts act to control the subtract key as follows:

As the paper carriage moves to its "proof" position the member 89 is moved downward to the position of Fig. 19. This causes the stud to strike the outside edge 177 of the V-shaped end of bell crank arm 159. The stud 169 also strikes the end of the latch 164 and it moves the latch to released position but the bell crank lever 160 cannot return to normal because of the engagement of the stud 169 with the outside edge of the end 177 of arm 159 of the bell crank. Accordingly, the bell crank lever 160 is held in the position of Fig. 18 where the end 174 of the bell crank 175 is under the lever 135 that controls the carriage return mechanism. This means that as soon as the paper carriage reaches its "proof" position, the carriage return mechanism is locked against operation if the subtract key was depressed in the "pickup" position of the carriage. If the operator does not depress the subtract key in the "proof" position of the carriage he cannot return the carriage to normal and he knows that a mistake has been made.

If the subtract key is depressed under the above conditions the bell crank lever 160 is pulled to the position of Fig. 20 and the shoulder 168 of the latch 164 snaps behind the stud 169. This latches the bell crank lever 160 in the position of Fig. 20 and, in this position of the bell crank lever, the link 171 is thrust upward far enough to move the end 174 of arm 175 from under the lever 135 to thereby free the carriage return mechanism. In other words, if the subtract key is depressed in the "proof" position of the paper carriage, after having been depressed in the "pickup" position of the paper carriage, the carriage return is free to operate.

The subtract key cannot be operated, however, under the above conditions until all of the proper amount keys have been depressed in the "proof" position of the paper carriage. This is due to the fact that the lever 117 with its lateral lug 120 occupies the position of Fig. 15 as long as the comb plate 110 remains elevated. This comb plate remains elevated until after all the proper amount keys have been depressed but after the last one has been depressed the comb plate moves down which moves the link 114 downward thereby moving the pivot 115 of the lever 114 downward which moves the lateral lug 120 from behind the hooked end 155 of the member 156 connected to the subtract rod 152.

If the subtract key is not depressed when the paper carriage was in its "pickup" position the bell crank lever 160 occupies the position of Fig. 17 and when the member 89 moves downward as the carriage reaches its "proof" position the stud 169 moves inside of the hooked end of the arm 159 of bell crank 160. This locks the bell crank lever 160 against clockwise movement and prevents the subtract key from being depressed while the carriage is in its "proof" position owing to the fact that the member 156 cannot move forward.

Restoring mechanism

When the paper carriage is in its "proof" position the pins 50 of the proof carriage are locked in the positions they occupy which would prevent their restoration. After the proper amount keys have been depressed in the "proof" position of the carriage the comb plate 110 drops down to the position of Fig. 8 while the proof pins 50 that have moved beyond the range of comb plate 110 remain elevated as are illustrated. It is, of course, necessary to restore these raised pins to normal.

Figure 8:
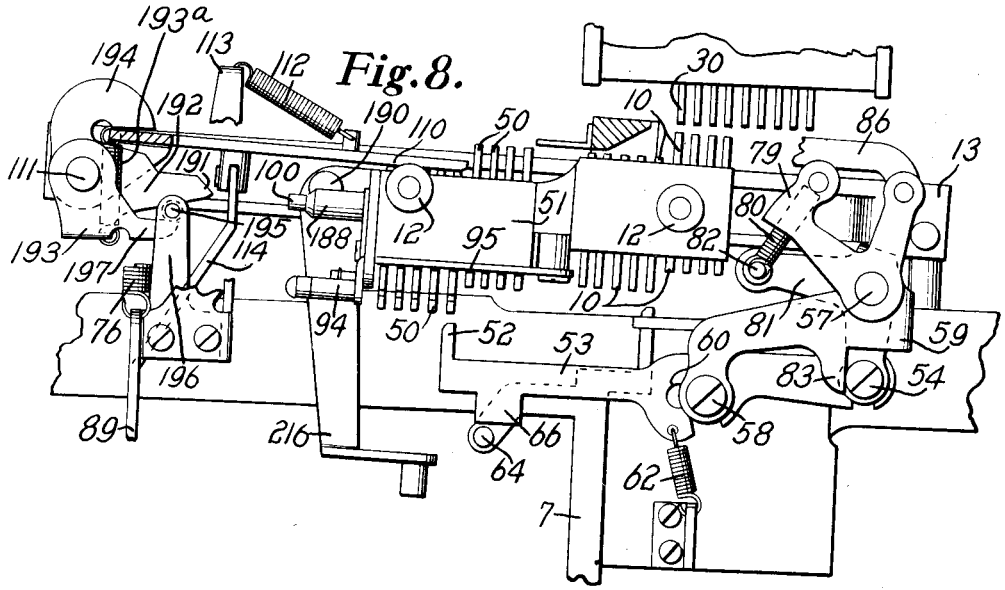
Fig. 8 is a view similar to Fig. 7 showing the parts in the position they occupy after an item has been entered with the paper carriage in its "proof" position.

At each operation of the machine the pin carriage 11 is moved to the left as viewed in Fig. 8 to restore it and its pins 10 to normal as explained in Hopkins Patent 1,336,904. This movement of the carriage to the left in Fig. 8 would be interfered with by the comb plate 110 if this plate were allowed to remain in the position of Fig. 8. However, the plate 110 remains raised for all positions of the carriage except the "proof" position and in this carriage position the plate moves down only after all the proper keys have been depressed.

In order to raise the comb plate in the "proof" position of the carriage to permit return of the carriage to the left as viewed in Fig. 8, a cam arm 180 is provided (Fig. 12) pivoted on the shaft 181. This arm has an extension 182 provided with a bifurcated end extending over a stud 183 on the link 114. The arm 180 also has a cam arm 184 having a cam face 185 adapted to be engaged by a stud 186 on an arm 187 fixed to the main drive shaft 26 that is oscillated at each operation of the machine. The arm 187 first moves counter clockwise from the position of Fig. 12 and then returns clockwise. As long as the link 114 is raised as shown in Figs. 12 and 15, and it is raised in all carriage positions except in the "proof" position after all the proper keys have been depressed, the cam surface 185 is out of the path of the stud 186, but when the link 114 moves downward when the comb plate 110 moves to its Fig. 8 position, the cam arm moves to the dot and dash position of Figs. 12 and 15. When the parts are in this position the stud 186 strikes the cam surface 185 at the beginning of the operation of the machine which rocks the cam arm 180 counter clockwise and raises the link 114 to raise the comb plate 110 out of the path of the raised proof pins 50 thereby freeing the pin carriage for movement to the left.

Figure 11:
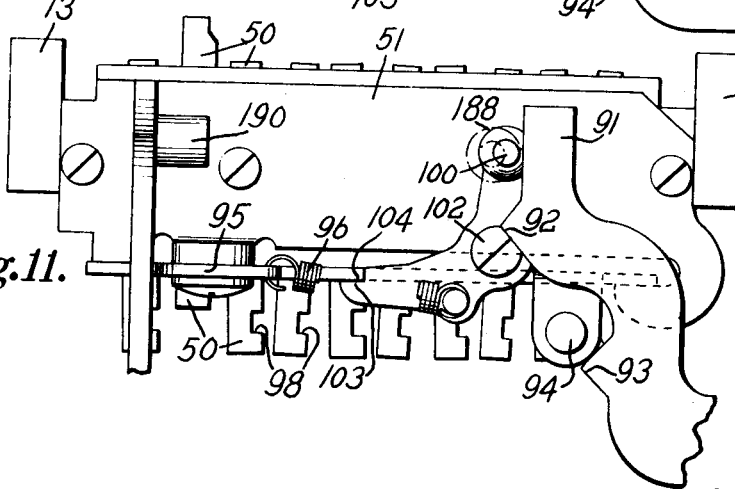
Fig. 11 is a partial right side elevation similar to Fig. 10 showing the controls in the position they occupy when the paper carriage is in its "proof" position.

As the pin carriage returns to the left the stud 100 on the end of latch 101 (Fig. 11) which, as will be observed in Fig. 8, has an enlarged portion 188 joined to its reduced end 100 by an inclined edge, strikes the edge of the extension 91 (Fig. 11) of the member 89 which latter member cams the stud to the dot and dash position of Fig. 11. This moves the latch 101 to released position thereby releasing the locking comb plate 95 which moves to the right under the influence of its spring 96 and unlocks the pins 50 of the proof carriage.

As the carriage continues to move to the left a stud 190 (Fig. 8) on the carriage frame engages the cam face 191 of an arm 192 extending from a yoke 193 (Fig. 3) pivoted on the shaft 111. This yoke has an upwardly extending curved arm 194 positioned to engage the top side of the comb plate 110. As the stud 190 hits the cam surface 191 the yoke is rocked clockwise and the curved arm 194 engages the top of the comb plate 110 which has been raised as previously explained, and moves the comb plate downward to restore the raised proof pins 50, the proof carriage having moved under the comb plate in a movement of the carriage to the left. The downward movement of the comb plate 110 is not interfered with by the cam surface 185 engaging stud 186 (Fig. 12) because at the time the above action takes place the stud 186 has passed beyond the cam surface 185 so that the link 114 can move downwardly. During the return movement of the arm 187 the stud 186 again raises the cam arm 180 and the link 114 raises the comb plate 110 to normal, the pin 190 having, in the meantime, moved away from the cam surface 191. This action does not occur until after the comb plate has been moved down to restore the pins.

Figure 21:
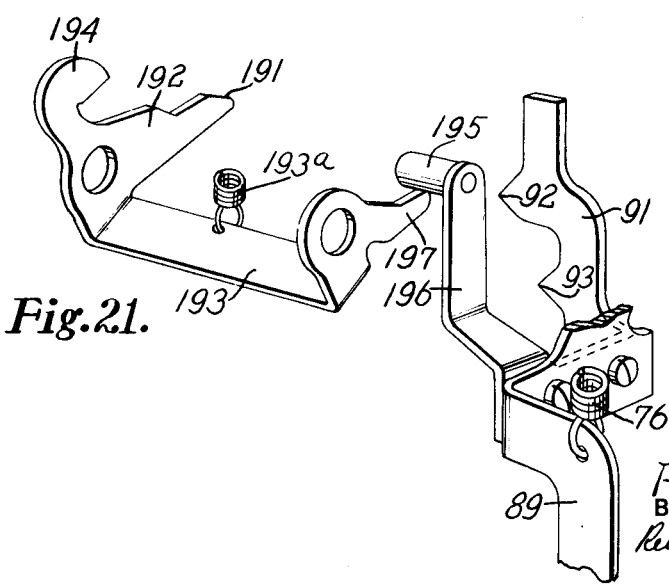
Fig. 21 is a perspective view of certain details of the proving mechanism.

Downward movement of the comb plate 110 is not caused by the yoke 193 and curved arm 194 during ordinary operations of the machine even though the carriage is moved to the left at each operation of the machine. This is due to the fact that the yoke 193 is normally held by a spring 193ª (Fig. 3) so that the cam surface 191 is out of the path of the stud 190, the comb plate 110 being held up by spring 112. When the carriage moves to its "proof" position the irregular shaped link or member 89 is moved down farther than in the "pick-up" column with the result that a stud 195 (Fig. 21) on an extension 196 of said link 89 engages an extension 197 of the yoke 193 and rocks said yoke clockwise to position cam surface 191 in the path of stud 190. As the pin carriage moves to the left, as viewed from the rear of the machine, the wide part 188 of stud 100 moves the latch 101 to release the pin locking plate 95. Further movement of the carriage to the left causes stud 190 to engage cam surface 191 to rock yoke 193 clockwise thereby causing the curved extension 194 to engage the top of comb plate 110 and move it downward to restore the projected pins 50.

Locking the error key

The usual error key E which returns the traveling pin carriage 11 to normal and restores any of the pins 10 that have been projected is also operated to restore the pins 50 in the proof carriage. Such restoration of the parts while the paper carriage is in its "pickup" position is a necessary convenience, but when the paper carriage is in its "proof" position the accuracy of the proving operations could be destroyed if the operator could restore the parts to normal by manipulation of the error key. Accordingly, provision has been made for locking the error key when the carriage is in "proof" position.

Referring to Fig. 12 it will be observed that the member 89 has a cam projection 200 on one of its edges with which cooperates a cam roller 201 on the end of one arm 202 of a bell crank lever pivoted at 203 to the stationary plate 116 and urged clockwise by a spring 204. The other arm 205 of this bell crank lever has a cam face 206 adapted to be engaged by a roller 207 on a projection 208 fixed to the error key slide 209. The latter is connected by a rod 210 to the error key E (Fig. 1). The slide 209 has a projection 211 (Fig. 12) adapted to pick up a slidable rack 212 (Fig. 13) as the slide 209 moves to the right in Fig. 12. The rack 212 meshes with a sector 213 that is fixed to shaft 214. This shaft has an arm 215 on its end (Fig. 3) having a pin and slot connection with a member 216 fixed to the pin carriage. The pin carriage is returned to normal and the incorrectly depressed pins restored through these connections.

Figure 14:
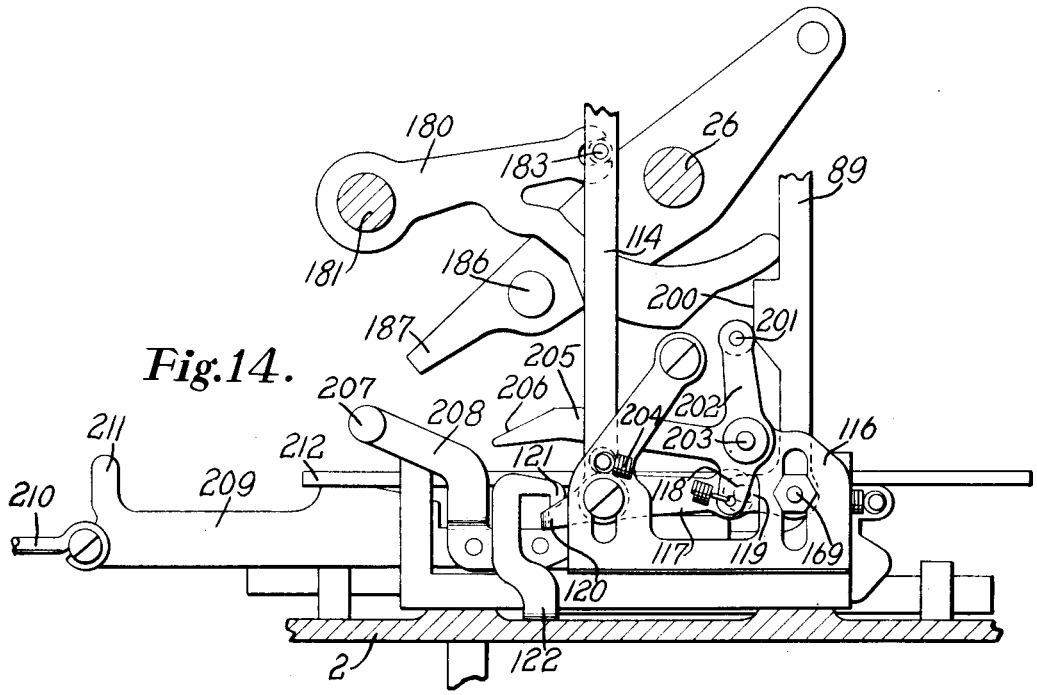
Fig. 14 is a partial right side elevation similar to Fig. 12 illustrating the parts in the position they occupy when the paper carriage is in its "pickup" position.

When the member 89 is moved downward by the paper carriage when the latter is in its "pickup" position the cam projection 200 occupies the position of Fig. 14 where it has cammed the bell crank lever 202-205 from the position of Fig. 12 to that of Fig. 14. If, when the parts are in this position, the error key is pushed rearward the roller 207 will strike the cam edge 206 and rock the bell crank lever 202-205 counter clockwise. The lower edge of arm 205 of the bell crank lever is positioned so as to engage a stud 217 on the link 114 (Fig. 14). When the bell crank lever 202-205 is moved counter clockwise, as above explained, the link 114 is drawn downwardly which draws the comb plate 110 down to restore the pins 50 in the proof carriage. The error key thus operates to restore the pins of the proof carriage to normal when the paper carriage is in its "pickup" position.

It is not desirable to have the pins of the proof carriage restored by manipulation of the error key while the paper carriage is in any of its intermediate or "transaction" positions and this is prevented by reason of the fact that when the paper carriage is in these positions the member 89 is raised to the position of Fig. 12, that is, it occupies its normal position. The cam surface 206 of bell crank lever 202-205 is thus out of the path of the stud 207 with the result that depression of the error key will not move the comb plate 110 and hence the pins in the proof carriage will not be restored. Manipulations of the error key under the above conditions return the traveling pin carriage to its starting position at the left of the machine as viewed in Fig. 2 and the proof carriage moves with it but this does not result in restoring the pins of the proof carriage although it does restore the pins in the traveling pin carriage.

When the paper carriage reaches its "proof" position the member 89 is moved down further than when the carriage is in its "pickup" position. The result of this is that the stud 118 (Figs. 12 and 13) on the projection 119 of the member 89 moves in front of the end of an extension 215 of the error key slide 209. This blocks the error key slide against rearward movement thereby preventing manipulation of the error key and makes it impossible for the operator, while the paper carriage is in its "proof" position, to manipulate the error key to restore any of the parts.

I claim:

1. A calculating machine of the ten key type having a set of digital amount keys adapted, in entering items, to be successively depressed in entering the digital values of different orders of said items, a proof pin carriage whose pins are set by depression of said keys during the entry of a given item thereon, said proof carriage being automatically rendered inactive after its pins have been set, and means acting automatically to put said proof carriage in control of said amount keys for a predetermined subsequent operation of the machine to prevent depression of said amount keys except as the same keys are depressed in the same succession as when said given item was first entered.

2. A calculating machine of the ten key type having amount keys adapted to be depressed in entering items in said machine, a traveling pin carriage for receiving said items, a proof pin carriage movable with said traveling pin carriage, connections for setting the pins of the latter carriage by depression of said amount keys during the entry of a given item, said proof carriage being automatically rendered inactive relative to said amount keys after said given item has been entered to permit subsequent operation of the machine independently of said proof carriage, and means acting automatically to render said proof carriage active for a predetermined subsequent operation of the machine, said connections acting, when said proof carriage is so rendered active, to prevent depression of said amount keys except as the same keys are depressed in the same succession as when said given item was first entered.

3. A calculating machine of the ten key type having amount keys adapted to be depressed in entering items in said machine, a traveling paper carriage, a traveling pin carriage for receiving items entered on said amount keys, a proof pin carriage movable with said traveling pin carriage, the pins of the latter being set by depression of said amount keys in a given columnar position of said paper carriage, said proof carriage being automatically rendered inactive relative to said amount keys when said paper carriage leaves said given columnar position, and means controlled by said paper carriage acting in a predetermined subsequent columnar position of the carriage to place said proof carriage in control of said amount keys to prevent depression of said amount keys except as the same keys are depressed in the same succession as when said carriage was in said first-mentioned given columnar position.

4. A calculating machine of the ten key type having amount keys adapted to be depressed in entering items in said machine, a traveling pin carriage, thrust bars operated by said amount keys for setting the pins in said pin carriage during the entry of items on said amount keys, a proof pin carriage, auxiliary thrust connections for setting the pins in the proof carriage, means conditioning said auxiliary thrust connections for a given operation of the machine to cause the pins in said proof carriage to be set at the same time that the pins are being set in said traveling pin carriage in the entry of a given item, said auxiliary connections being automatically disabled after said given item has ben entered, means acting automatically to enable said auxiliary connections for a predetermined subsequent operation of the machine, and means automatically locking the pins of said proof carriage for said subsequent operation, said auxiliary connections acting, after they have been so enabled and the proof pins have been locked, to prevent depression of said amount keys except as the same keys are depressed in the same succession as when said given item was first entered.

5. A calculating machine of the ten key type having keys adapted to be depressed in entering items in said machine, a traveling pin carriage, thrust bars operated by said amount keys for setting the pins in said pin carriage, a proof pin carriage, thrust connections adapted to be conditioned by said paper carriage in a given columnar position thereof to cause the pins of said proof carriage to be set at the same time that the pins in said traveling pin carriage are set in the entry of a given item, means automatically disabling said thrust connections when said paper carriage moves away from said columnar position, means automatically enabling said thrust connections when said paper carriage reaches a predetermined subsequent columnar position, and means automatically locking the pins of said proof carriage in their set position when said paper carriage reaches said subsequent position, said thrust connections and said locked proof pins acting to prevent depression of said amount keys except as the same keys are depressed in the same succession as when said given item was first entered.

6. A motor-driven calculating machine having amount keys adapted to be depressed in entering items in said machine, a traveling paper carriage, a motor bar for causing the motor to operate the machine, a proving mechanism set automatically during the entry of a given item in said machine when said paper carriage is in a given columnar position, said proving mechanism being automatically rendered inactive after said given item has been entered, means automatically rendering said proving mechanism active in a subsequent predetermined columnar position of said carriage where said given item is to be again entered, and connections controlled by said proving mechanism in said subsequent columnar position of said carriage acting to prevent operation of said motor bar unless all of the same amount keys are depressed in the same succession as when said given item was first entered.

q. A calculating machine having amount keys adapted to be depressed in entering items in said machine, operating means, a proving mechanism set by depression of said amount keys during the entry of a given item thereon, said proving mechanism being automatically rendered inactive after said given item has been entered, means for subsequently rendering said proving mechanism active for a predetermined operation of the machine, and connections controlled by said proving mechanism when it is rendered active the second time preventing operation of said operating means until the same amount keys are depressed in the same succession as when said given item was first entered.

8. A calculating machine of the ten key type having a set of digital amount keys adapted, in entering items in said machine, to be successively depressed to enter the digital values of different orders of said items, calculating mechanism, means for operating the machine, a proving mechanism set automatically during the entry of a given item in said machine, said proving mechanism being automatically rendered inactive after said given item has been entered, and means subsequently rendering said proving mechanism active for a predetermined operation of the machine, said proving mechanism acting automatically, when rendered active, to prevent said subsequent operation unless the same amount keys are depressed in the same succession as when said given item was first entered.

9. A calculating machine of the ten key type having a set of digital amount keys adapted, in entering items in said machine, to be successively depressed to enter the digital values of different orders of said items, means for operating the machine, a traveling paper carriage, a proving mechanism set automatically by depression of said amount keys during the entry of an item in said machine when said paper carriage is in a given columnar position, and means causing said proving mechanism to act automatically in a subsequent predetermined columnar position of the carriage to prevent operation of the machine unless the same amount keys are depressed in the same succession as they were depressed when said carriage was in its first-mentioned given columnar position.

10. A calculating machine of the ten key type having amount keys adapted to be depressed in entering items in said machine, means for operating the machine, a proof pin carriage having pins set during the entry of a given item in said machine, said proof carriage acting automatically for a predetermined subsequent operation of the machine to prevent depression of said amount keys except as the same keys are depressed in the same succession as when said given item was first entered, and means controlled by the pins of said proof carriage preventing operation of the machine until all of said amount keys have been depressed that were depressed in the first entry of said given item.

11. A calculating machine of the ten key type having amount keys adapted to be depressed in entering items in said machine, means for operating the machine, a traveling pin carriage for receiving items entered on the amount keys, a proof pin carriage movable with said traveling pin carriage, the pins of the latter being set by said amount keys during the entry of an item for a given operation of the machine, means automatically disabling said proof carriage with relation to said amount keys to permit operation of the machine independently of said proof carriage and automatically placing said proof carriage in control of said amount keys for a predetermined subsequent operation of the machine, and connections controlled by said proof carriage preventing operation of the machine unless the same amount keys are depressed in the same succession as were depressed when said item was entered during said first given operation of the machine.

12. In a motor driven calculating machine of the ten key type having amount keys adapted to be depressed in entering items in said machine, a motor bar for causing the motor to operate the machine, a traveling paper carriage, a traveling pin carriage for receiving items entered on said amount keys, and a tabulating mechanism for tabulating the pin carriage as the keys are depressed; a proof pin carriage movable with said traveling pin carriage, connections for setting the pins in said proof carriage when an item is entered on the amount keys in a given columnar position of the paper carriage, locking means set by said paper carriage when it reaches a predetermined subsequent columnar position for locking said motor bar against operation, and means held in position by the set pins of said proof carriage for holding said locking means in locking position, said holding means acting to release said locking means automatically when said proof pin carriage is tabulated beyond said holding means by the reentry of an item.

13. A calculating machine having amount keys adapted to be depressed in entering items in said machine, a traveling paper carriage, a carriage return mechanism, a proving mechanism set during the entry of an item in said machine in a given columnar position of said carriage, said proving mechanism being automatically rendered inactive after said item has been entered, means automatically rendering said proving mechanism active in a subsequent predetermined columnar position of the carriage, and connections controlled by said proving mechanism acting to prevent operation of said carriage return mechanism until all of the same amount keys are depressed in said subsequent columnar position of the carriage as were depressed in said first columnar position thereof.

14. A calculating machine having amount keys adapted to be depressed in entering items in said machine, a traveling paper carriage, a carriage return mechanism, a proving mechanism set during the entry of an item in said machine with the paper carriage in a predetermined columnar position, said proving mechanism being automatically rendered inactive after said item has been entered, means automatically rendering said proving mechanism active in a predetermined subsequent columnar position of the carriage, and connections controlled by said proving mechanism acting to prevent operation of said carriage return mechanism until all the same amount keys are depressed in the same succession as when said carriage was in its first columnar position.

15. A calculating machine of the ten key type having amount keys adapted to be depressed in entering items in said machine, a traveling paper carriage, a carriage return mechanism, a proof pin carriage having pins set during the entry of an item in said machine while said paper carriage is in a given columnar position, said proof carriage being automatically rendered inactive after said paper carriage leaves said columnar position, means automatically rendering said proving mechanism active in a predetermined subsequent columnar position of said paper carriage, and connections controlled by said proof pins preventing operation of said carriage return mechanism unless the same amount keys are depressed in the same succession in said subsequent columnar position of said paper carriage as were depressed in the first columnar position thereof.

16. A calculating machine having amount keys adapted to be depressed in entering items in said machine, a traveling paper carriage, a carriage return mechanism, a conditioning means for conditioning the machine for subtraction, and means set by said conditioning means when moved to subtraction position in a given columnar position of the carriage acting automatically to prevent operation of said carriage return mechanism in a subsequent predetermined columnar position of the carriage unless said conditioning means is moved to subtraction condition.

17. A calculating machine having amount keys adapted to be depressed in entering items in said machine, a traveling paper carriage, a carriage return mechanism, a conditioning means for conditioning the machine for subtraction, means set by said conditioning means when the paper carriage is in a given columnar position and controlled by said paper carriage in a predetermined subsequent columnar position of the carriage to prevent operation of said carriage return mechanism in said subsequent columnar position of the carriage unless the conditioning means is moved to subtraction position.

18. A calculating machine having amount keys adapted to be depressed in entering items in said machine, a conditioning means for conditioning the machine for subtraction, a proving mechanism set during the entry of a given item in said machine, said proving mechanism being automatically renderd inactive after said given item has been entered, means automatically rendering said proving mechanism active for a predetermined subsequent operation of the machine, and connections controlled by said proving mechanism and set by the movement of said conditioning means to subtraction position when said given item was first entered, acting to prevent said conditioning means from being moved to subtraction condition for said subsequent operation until after all of the same amount keys have been depressed as were depressed when said given item was first entered.

19. A calculating machine of the ten key type having amount keys adapted to be depressed in entering items in said machine, conditioning means for conditioning the machine for subtraction, a proving mechanism set during the entry of a given item in said machine, said proving mechanism being automatically rendered inactive after said given item has been entered, means automatically rendering said proving mechanism active for a predetermined subsequent operation of the machine, and connections controlled by said proving mechanism preventing said conditioning means from being moved to subtraction condition unless the same amount keys are depressed in the same succession as when said given item was first entered.

20. A calculating machine of the ten key type having amount keys adapted to be depressed for the entry of items in said machine, a conditioning means for conditioning the machine for subtraction, a proof pin carriage having pins that are projected during the entry of a given item for a given operation of the machine, said pin carriage being automatically rendered inactive after said item is entered, means rendering said pin carriage active for a predetermined subsequent operation of the machine, and means controlled by the pins of said carriage and set by movement of said conditioning means to subtraction condition during the entry of said given item acting to prevent said conditioning means from being moved to subtraction condition for said subsequent operation until all of the same amount keys have been depressed as were depressed during the first entry of said given item.

21. A calculating machine having amount keys, a traveling paper carriage, a carriage return mechanism, a subtraction key and connections adapted to be depressed to enter a negative item in a given columnar position of the carriage, and means acting automatically in a subsequent predetermined columnar position of the carriage to prevent operation of said carriage return mechanism unless the same amount keys are depressed and unless said subtract key is depressed in said subsequent columnar position of said carriage.

22. A calculating machine having amount keys adapted to be depressed in entering items in said machine, a proving mechanism set during the entry of a given item in said machine, an error key for restoring said proving mechanism to normal, said proving mechanism being automatically rendered inactive after said given item has been entered, means automatically rendering said proving mechanism active for a predetermined subsequent operation of the machine to thereby place said proving mechanism in control of said amount keys, and means automatically locking said error key against depression when said proving mechanism is thus rendered active.

23. A machine of the class described having manipulative members adapted to be manipulated in entering items in said machine, a registering mechanism for receiving said items, a proving mechanism set automatically during the entry of a given item, means automatically rendering said proving mechanism temporarily inactive after it has been set to enable other items to be subsequently entered in said registering mechanism without disturbing said proving mechanism, and means causing said proving mechanism to act automatically for a predetermined subsequent machine operation where said given item is to be again entered to prevent manipulation of said manipulative members except as the same members are manipulated in the same succession as when said given item was first entered.

24. A machine of the class described having amount keys adapted to be depressed in entering items in said machine, a registering mechanism for receiving said items, a printing mechanism controllable by said registering mechanism to print totals from the latter, a proving mechanism set automatically during the entry of a given item, means automatically rendering said proving mechanism temporarily inactive after it has been set to enable other items to be subsequently entered in said registering mechanism and totals to be taken without disturbing said proving mechanism, and means causing said proving mechanism to act automatically for a predetermined subsequent machine operation where said given item is to be again entered to prevent depression of said amount keys except as the same amount keys are depressed in the same succession as when said given item was first entered.

25. A machine of the class described having amount keys adapted to be depressed in entering items in said machine, a registering mechanism for receiving said items, a printing mechanism controllable by said registering mechanism to print totals from the latter, a proving mechanism set by depression of said amount keys during the entry of a given item, means automatically rendering said proving mechanism temporarily inactive after it has been set to enable other items to be subsequently entered in said registering mechanism and totals to be taken without disturbing said proving mechanism, and means causing said proving mechanism to act automatically for a predetermined subsequent machine operation where said given item is to be again entered to prevent depression of said amount keys except as the same amount keys are depressed in the same succession and when said given item was first entered.

26. A machine of the class described having amount keys adapted to be depressed in entering items in said machine, a registering mechanism for receiving said items, a printing mechanism controllable by said registering mechanism to print totals from the latter, a traveling paper carriage, a proving mechanism set automatically during the entry of a given item in a certain columnar position of said carriage, means automatically rendering said proving mechanism temporarily inactive after it has been set to enable other items to be subsequently entered in said registering mechanism and totals to be taken without disturbing said proving mechanism, and means controlled by said paper carriage acting automatically in a predetermined columnar position of said carriage where said given item is to be again entered to cause said proving mechanism to prevent depression of said amount keys except as the same amount keys are depressed in the same succession as when said given item was first entered.

27. A calculating machine of the ten-key type having a set of digital amount keys adapted, in entering items in said machine, to be successively depressed in entering the digital values of different orders of said items, a registering mechanism for receiving said items, a proving mechanism set automatically during the entry of a given item, means automatically rendering said proving mechanism temporarily inactive after it has been set to enable other items to be subsequently entered in said registering mechanism without disturbing said proving mechanism, and means causing said proving mechanism to act automatically for a predetermined subsequent machine operation where said given item is to be again entered to prevent depression of said amount keys except as the same keys are depressed in the same order as when said given item was first entered.

28. A calculating machine of the ten-key type having a set of digital amount keys adapted, in entering items in said machine, to be successively depressed in entering the digital values of different orders of said items, a registering mechanism for receiving said items, a printing mechanism controllable by said registering mechanism to print totals from the latter, a proving mechanism set automatically by depression of said keys during the entry of a given item, means automatically rendering said proving mechanism temporarily inactive after it has been set to enable other items to be subsequently entered in said registering mechanism and totals to be taken therefrom without disturbing said proving mechanism, and means causing said proving mechanism to act automatically for a predetermined subsequent machine operation where said given item is to be again entered to prevent depression of said amount keys except as the same amount keys are depressed in the same order as when said given item was first entered.

29. A calculating machine of the ten-key type having a set of digital amount keys adapted, in entering items in said machine to be successively depressed in entering the digital values of different orders of said items, a registering mechanism for receiving said items, a traveling paper carriage, a proving mechanism set automatically during the entry of a given item in a predetermined columnar position of the carriage, means automatically rendering said proving mechanism temporarily inactive after it has been set to enable other items to be subsequently entered in said registering mechanism without disturbing said proving mechanism, and means controlled by said paper carriage acting automatically in a predetermined subsequent columnar position of said carriage where said given item is to be again entered to prevent depression of said amount keys except as the same keys are depressed in the same order as when said given item was first entered.

30. A calculating machine of the ten-key type having a set of digital amount keys adapted, in entering items in said machine, to be successively depressed in entering the digital values of different orders of said items, a registering mechanism for receiving said items, a printing mechanism controllable by said registering mechanism to print totals from the latter, a traveling paper carriage, a proving mechanism set automatically by depression of said amount keys in entering a given item in a predetermined columnar position of said carriage, means automatically rendering said proving mechanism temporarily inactive after it has been set to enable other items to be entered in said registering mechanism and totals to be taken therefrom without disturbing said proving mechanism, and means controlled by said paper carriage acting in a predetermined subsequent columnar position thereof where said given item is to be again entered to prevent depressing of said amount keys except as the same keys are depressed in the same order as when said given item was first entered.

31. A calculating machine having an operating means, amount keys adapted to be depressed in entering items in said machine, a registering mechanism for receiving said items, a proving mechanism set automatically during the entry of a given item, means automatically rendering said proving mechanism temporarily inactive after it has been set to enable other items to be subsequently entered in said registering mechanism without disturbing said proving mechanism, and means causing said proving mechanism to act for a predetermined subsequent machine operation where said given item is to be again entered to compel depression, in order to operate said machine by said operating means, of all the same amount keys in the same succession as when said given item was first entered.

32. A machine of the class described having an operating means, amount keys adapted to be depressed in entering items in said machine, a registering mechanism for receiving said items, a printing mechanism controllable by said registering mechanism to print totals from the latter, a proving mechanism set automatically by depression of said keys during the entry of a given item, means automatically rendering said proving mechanism temporarily inactive after it has been set to enable other items to be entered in said registering mechanism and a total to be taken therefrom without disturbing said proving mechanism, and means causing said proving mechanism to act automatically for a predetermined subsequent machine operation where said given item is to be again entered to compel depression, in order to operate said machine by said operating means, of all of the same amount keys in the same succession as when said given item was first entered.

33. A machine of the class described having an operating means, amount keys adapted to be depressed in entering items in said machine, a registering mechanism for receiving said items, a traveling paper carriage, a proving mechanism set automatically during the entry of a given item in said machine in a predetermined columnar position of the carriage, means automatically rendering said proving mechanism temporarily inactive after it has been set to enable other items to be subsequently entered in said registering mechanism without disturbing said proving mechanism, and means controlled by said paper carriage acting automatically in a predetermined columnar position thereof where said given item is to be again entered to compel depression, in order to operate said machine by said operating means, of all of the same amount keys in the same succession as when said given item was first entered.

34. A calculating machine having amount keys adapted to be depressed in entering items in said machine, a conditioning means for conditioning the machine for subtraction, a proving mechanism set during the entry of a given item in said machine, said proving mechanism being automatically rendered inactive after it has been set to enable said machine to be subsequently operated without disturbing said proving mechanism, means automatically rendering said proving mechanism active for a predetermined subsequent operation of said machine where said given item is to be again entered to place said proving mechanism in control of said amount keys, and means acting automatically to prevent said conditioning means from being moved to subtraction condition for said subsequent operation of the machine until after all of the same amount keys have been depressed as were depressed when said given item was first entered.

35. A calculating machine of the ten-key type having a set of digital amount keys adapted, in entering items, to be successively depressed in entering the digital values of different orders of said items, conditioning means for conditioning the machine for subtraction, a proving mechanism set automatically during the entry of a given item in said machine, means automatically rendering said proving mechanism inactive after it has been set to enable other items to be entered without disturbing said proving mechanism, means automatically rendering said proving mechanism active for a subsequent predetermined operation of the machine where said given item is to be again entered to prevent depression of said amount keys except as they are depressed in the same order as when said given item was first entered, and means preventing said subtraction conditioning means from being moved to subtract condition during said subsequent predetermined operation when said subtraction conditioning means was not moved to subtraction position during the first entry of said given item.

36. A calculating machine having depressible amount keys, a traveling paper carriage, a carriage return mechanism, means for conditioning the machine for subtraction to enable a negative item to be entered in a given columnar position of said carriage, a proving mechanism set automatically during the entry of said given item, means automatically rendering said proving mechanism inactive after it has been set to enable subsequent operation of the machine without disturbing said proving mechanism, means acting automatically in a subsequent predetermined columnar position of the carriage to prevent depression of said amount keys except as the same keys are depressed in the same condition as when said negative item was first entered, and means preventing operation of said carriage return mechanism in said subsequent predetermined columnar position of the carriage unless said conditioning means is moved to subtraction condition.

37. A calculating machine of the ten-key type having amount keys adapted to be depressed in entering items in said machine, a traveling pin carriage for receiving said items, a proof pin carriage whose pins are set by depression of said keys during the entry of a given item, an error key for restoring the pins of both of said carriages, means rendering said proof pin carriage inactive after its pins have been set to enable other items to be subsequently entered and said machine operated without disturbing the pins of said proof carriage, means acting automatically for a predetermined subsequent operation of the machine in which said given item is to be again entered to place the pins of said proof carriage in control of said amount keys, and means automatically locking said error key against restoration of said proof pins for said subsequent predetermined machine operation.

In testimony whereof, I have subscribed my name.

RAYMOND G. BOWER.